United States Patent
Sano

(10) Patent No.: US 11,539,132 B2
(45) Date of Patent: Dec. 27, 2022

(54) POWER DIVIDER, ANTENNA APPARATUS, AND WIRELESS COMMUNICATION APPARATUS

(71) Applicant: Kabushiki Kaisha Toshiba, Tokyo (JP)

(72) Inventor: Makoto Sano, Ota Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 16/948,252

(22) Filed: Sep. 10, 2020

(65) Prior Publication Data

US 2021/0296771 A1  Sep. 23, 2021

(30) Foreign Application Priority Data

Mar. 18, 2020  (JP) .............................. JP2020-048234

(51) Int. Cl.
*H01Q 3/28* (2006.01)
*H01Q 3/36* (2006.01)
*H04B 3/52* (2006.01)

(52) U.S. Cl.
CPC ................. *H01Q 3/28* (2013.01); *H01Q 3/36* (2013.01); *H04B 3/52* (2013.01)

(58) Field of Classification Search
CPC . H01Q 3/28; H01Q 3/36; H01Q 9/045; H04B 3/52; H01P 5/222
USPC ........................................................ 375/257
See application file for complete search history.

(56) References Cited

U.S. PATENT DOCUMENTS

| 5,745,079 | A | 4/1998 | Wang et al. | |
|---|---|---|---|---|
| 2002/0079984 | A1* | 6/2002 | McKay | ..................... H01P 5/12 333/117 |
| 2010/0079219 | A1* | 4/2010 | Sakagami | ................. H01P 5/12 333/125 |

FOREIGN PATENT DOCUMENTS

| JP | H10-150320 A | 6/1998 |
|---|---|---|
| JP | 2009-171326 A | 7/2009 |

OTHER PUBLICATIONS

Xian-Jing Lin et al., "High Isolation Dual-Polarized Patch Antenna with Hybrid Ring Feeding," International Journal of Antennas and Propagation, vol. 2017, Art. 6193102, 6 pages (2017).

* cited by examiner

*Primary Examiner* — Fitwi Y Hailegiorgis
(74) *Attorney, Agent, or Firm* — Finnegan, Henderson, Farabow, Garrett & Dunner, LLP

(57) ABSTRACT

According to one embodiment, a power divider includes a first transmission line, a first input transmission line, a second input transmission line, and the plurality of output transmission lines. The first transmission line has a closed structure. The first input transmission line and the second input transmission line are connected to the first transmission line at locations away from each other along the first transmission line by approximately a quarter of a length of the first transmission line. The plurality of output transmission lines are connected to the first transmission line at locations dividing the length of the first transmission line substantially evenly.

20 Claims, 27 Drawing Sheets

US 11,539,132 B2

POWER DIVIDER, ANTENNA APPARATUS, AND WIRELESS COMMUNICATION APPARATUS

CROSS REFERENCE TO RELATED APPLICATIONS

This application is based upon and claims the benefit of priority from the prior Japanese Patent Application No. 2020-048234, filed on Mar. 18, 2020, the entire contents of which are incorporated herein by reference.

FIELD

Embodiments described herein relate to a power divider, an antenna apparatus, and a wireless communication apparatus.

BACKGROUND

A power divider that divides power of an input high frequency signal to supply power to an antenna element has been known. In a case where the power divider divides a high frequency signal as N high frequency signals (N is an integer not less than 2), N divided signals each shift of $2\pi/N$, which makes it difficult to use multiple polarized waves in combination. For that reason, a power divider that enables multiple polarizations to be used in combination is desired.

DETAILED DESCRIPTION

Figure 1A:
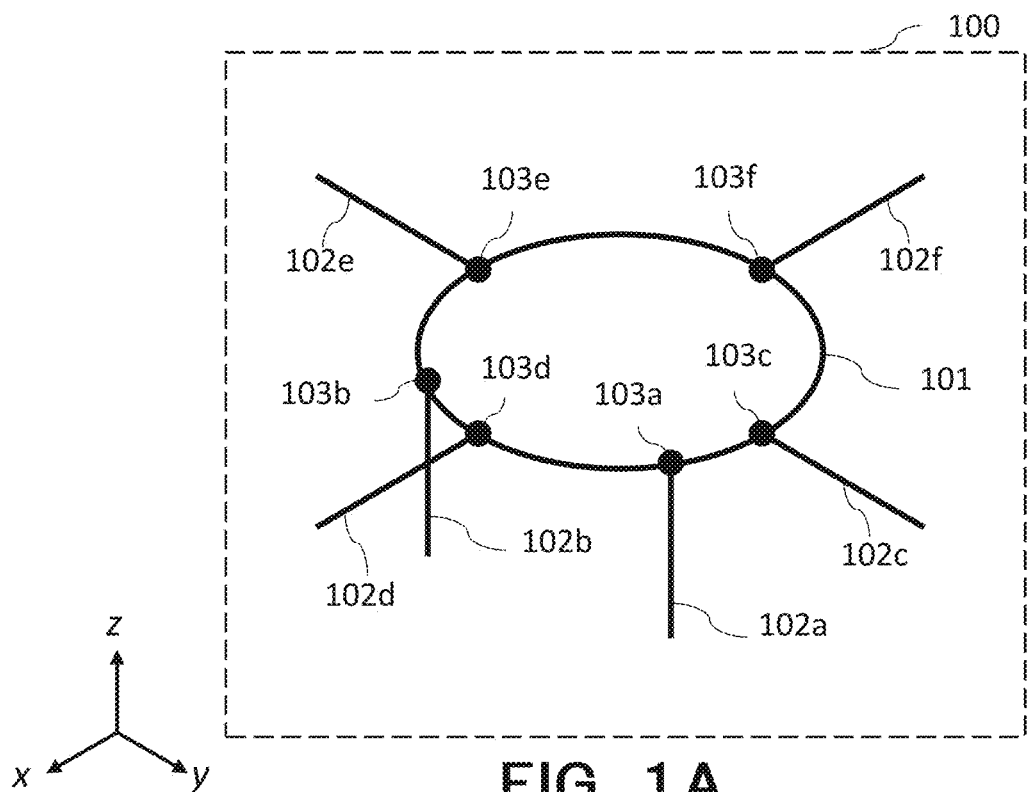
FIG. 1A and FIG. 1B are configuration diagrams of a power divider 100 in a first embodiment.

According to one embodiment, a power divider includes a first transmission line, a first input transmission line, a second input transmission line, and the plurality of output transmission lines. The first transmission line has a closed structure. The first input transmission line and the second input transmission line are connected to the first transmission line at locations away from each other along the first transmission line by approximately a quarter of a length of the first transmission line. The plurality of output transmission lines are connected to the first transmission line at locations dividing the length of the first transmission line substantially evenly.

Embodiments for carrying out the present invention will be described below with reference to the drawings. Note that the present disclosure is merely an example. Content described in the following embodiments should not be construed to limit the present invention. Alterations easily conceived by those skilled in the art are included within the range of the disclosure as a matter of course. For the sake of clarity of description, the drawings may be schematically illustrated with sizes, shapes, and the like of the components changed with respect to those in actual aspects. In the drawings, corresponding components will be denoted by the same reference characters and may not be described in detail.

First Embodiment

Figure 1B:
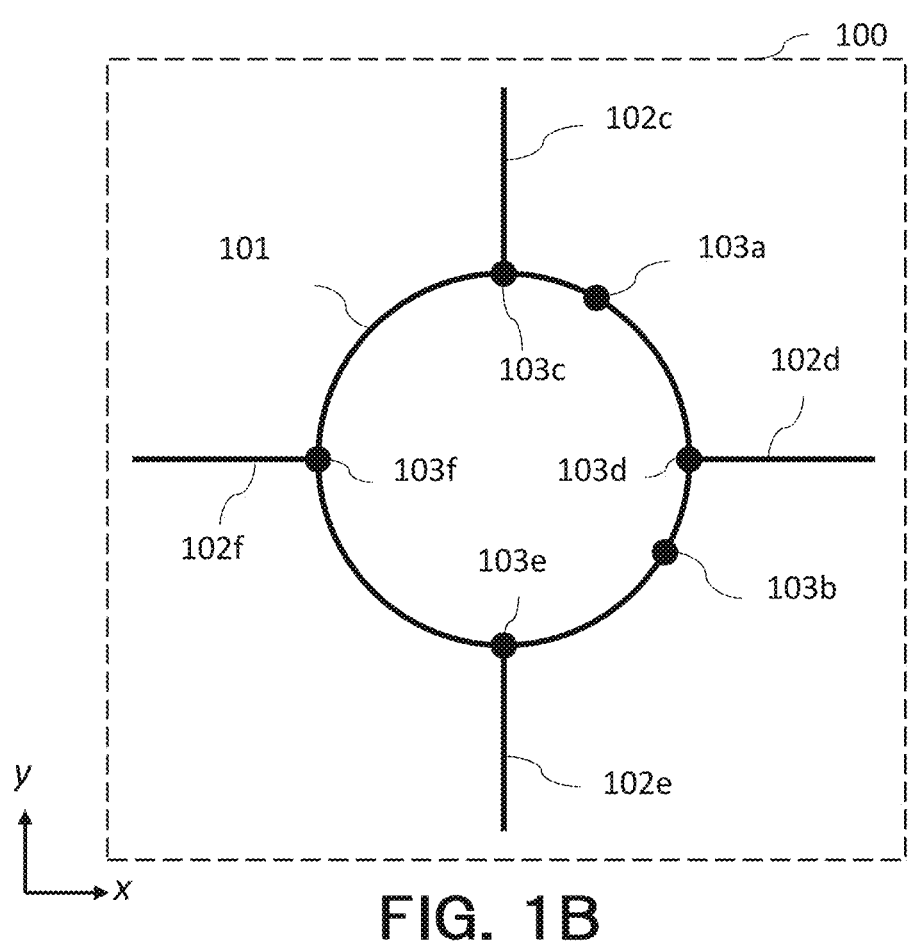

FIG. 1A and FIG. 1B are diagrams illustrating a configuration of a power divider 100 in a first embodiment. FIG. 1A is a solid view of the power divider 100, and FIG. 1B is an xy plan of the power divider 100. The power divider includes a transmission line 101 having a closed structure and transmission lines 102a, 102b, 102c, 102d, 102e, and 102f. The transmission lines 102a and 102b are transmission lines to which a high frequency signal is input. In the embodiments, the high frequency signal refers to, for example, an electric signal having a frequency used for a carrier wave of wireless communication. The transmission lines 102a and 102b will be hereinafter also referred to as input transmission lines. The high frequency signal input to the transmission line 102a or 102b is output via the transmission line 101 to at least two of the transmission lines 102c, 102d, 102e, and 102f. The transmission lines 102c, 102d, 102e, and 102f will be hereinafter also referred to as output transmission lines. In the first embodiment, the power divider 100 divides and outputs the high frequency signal input to the transmission line 102a to N of the output transmission lines (N is at least two) (hereinafter, also referred to as a high frequency signal a). Similarly, the power divider 100 divides and outputs the high frequency signal input to the transmission line 102b to N of the output transmission lines (hereinafter, also referred to as a high frequency signal b).

The transmission line 101 is a transmission line having a closed structure. As the transmission line 101, any transmission line through which the high frequency signal propagates is applicable. Examples of such a transmission line include a microstrip line, a coplanar line, a stripline, a parallel stripline, a coaxial line, a post-wall waveguide, a waveguide, and the like. The closed structure of the transmission line 101 refers to a unicursal shape. Examples of such a shape include a circle, an ellipse, a square, a rectangle, a polygon, and a shape made by combining lines and/or curves. The examples include a loop-shaped transmission line. The shape of the transmission line 101 is not limited to a planar shape and may be a solid shape. As an example, FIG. 1B illustrates the transmission line 101 in a circular shape.

The transmission lines 102a to 102f are lines through which a high frequency signal propagates. The transmission line 102a is connected to the transmission line 101 at a connection portion 103a, the transmission line 102b is connected to the transmission line 101 at a connection portion 103b, the transmission line 102c is connected to the transmission line 101 at a connection portion 103c, the transmission line 102d is connected to the transmission line 101 at a connection portion 103d, the transmission line 102e is connected to the transmission line 101 at a connection portion 103e, and the transmission line 102f is connected to the transmission line 101 at a connection portion 103f. To the transmission lines 102a to 102f, the same transmission lines as the transmission line 101 are applicable. A plurality of kinds of transmission lines may be used for the transmission line 101 and the transmission lines 102a to 102f. However, the input transmission lines (transmission lines 102a and 102b) are preferably transmission lines of the same kind, and the output transmission lines (transmission lines 102c to 102f) are preferably transmission lines of the same kind.

The connection portions 103a to 103f connect the transmission line 101 to the corresponding transmission lines 102a to 102f. The connection portions 103a to 103f may be anything that can connect the transmission line 101 to the corresponding transmission lines 102a to 102f. For example, connectors, solder, conductor vias, or the like are applicable. The transmission line 101 and at least one of the transmission lines 102a to 102f may be integrally formed. In this case also, the transmission line 101 is to be connected to the at least one of the transmission lines 102a to 102f formed integrally with the transmission line 101 via at least one of corresponding connection portions 103a to 103f. In this case, the connection portions 103a to 103f may be parts of the transmission line 101 or parts of the corresponding transmission lines 102a to 102f.

The connection portions 103a and 103b are separated from each other along the transmission line 101 by approximately a quarter of a length of the transmission line 101. The approximately a quarter of the length of the transmission line 101 is an extent that allows manufacturing errors or machining errors of the transmission line 101 and the connection portions 103a and 103b. The connection portions 103c, 103d, 103e, and 103f divide the length of the transmission line 101 substantially evenly. That is, the connection portions 103c and 103d, the connection portions 103d and 103e, the connection portions 103e and 103f, and the connection portions 103f and 103c are each separated from each other along the transmission line 101 by approximately the quarter of the length of the transmission line 101. The approximately a quarter of the length of the transmission line 101 is an extent that allows manufacturing errors or machining errors of the transmission line 101 and the connection portions 103c, 103d, 103e, and 103f.

The disposition of the connection portions 103a to 103f as described above can make components of the high frequency signal a input to the transmission line 102a and output to the output transmission lines orthogonal to components of the high frequency signal b input to the transmission line 102b and output to the output transmission lines. The components of the high frequency signals a and b being orthogonal to each other causes an antenna that emits the divided high frequency signals to emit a polarized wave based on the high frequency signal a and a polarized wave based on the high frequency signal b that is orthogonal to the polarized wave based on the high frequency signal a. That is, the polarized waves can be used in combination.

Figure 2:
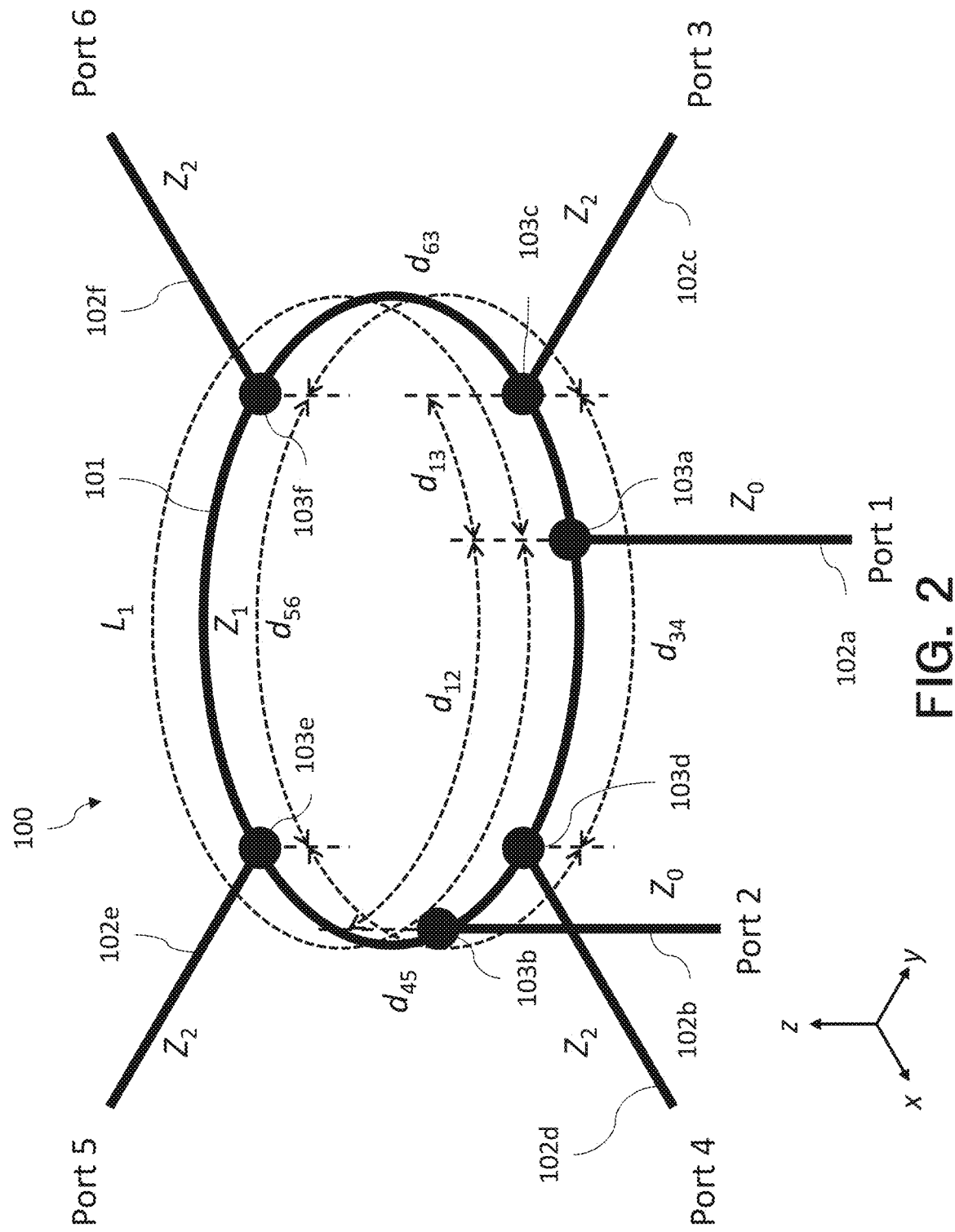
FIG. 2 is an arrangement plan of transmission lines 101 and 102a to 102f in the first embodiment.
Figure 3A:
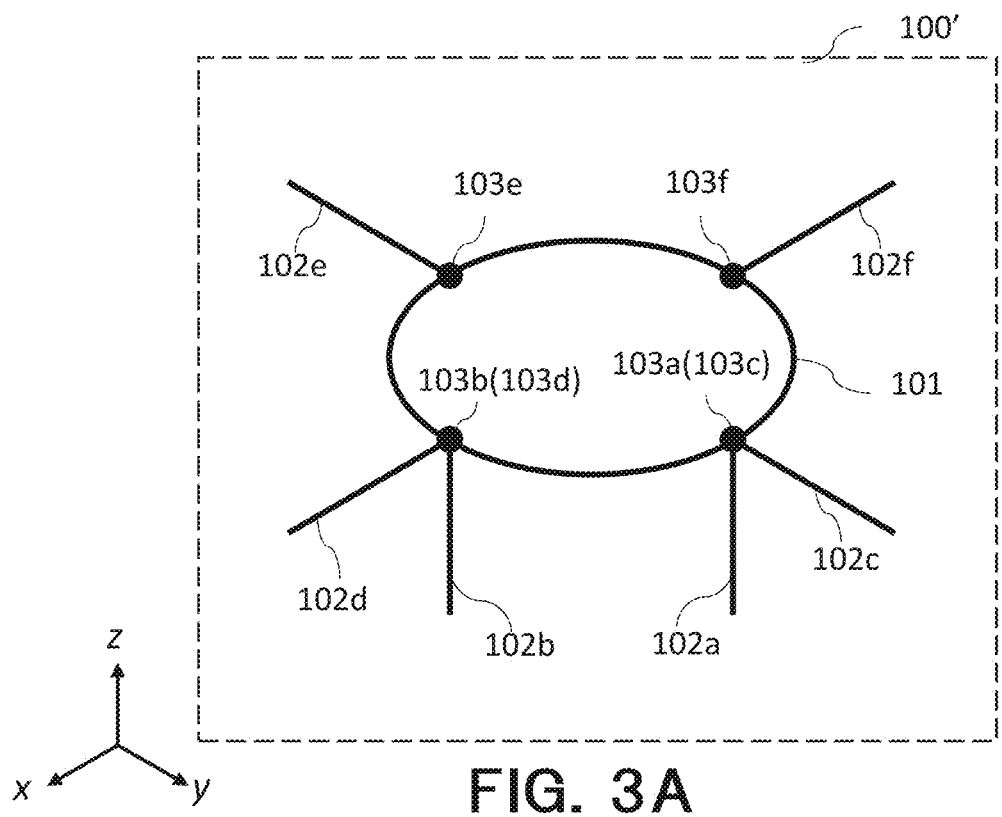
FIG. 3A and FIG. 3B are configuration diagrams of a power divider 100' in the first embodiment.
Figure 3B:
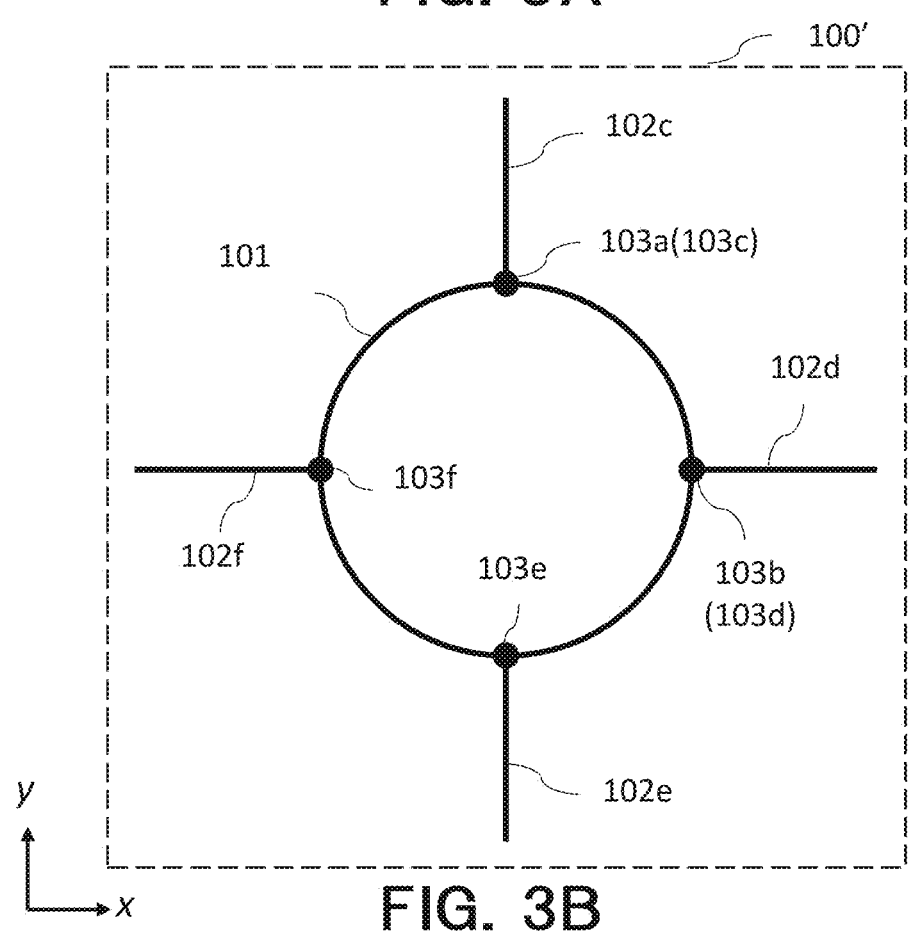
Figure 4:
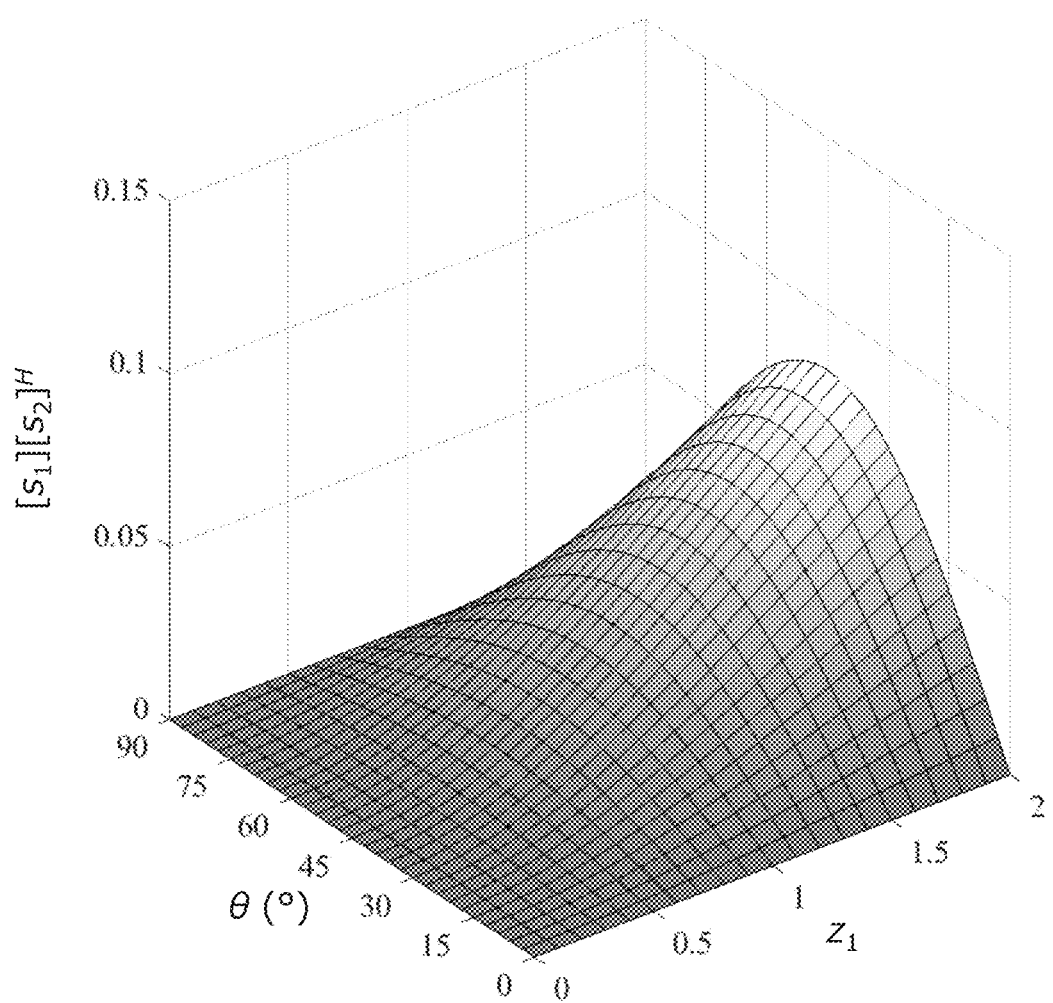
FIG. 4 is a graph illustrating a relation among normalized characteristic impedance "$z_1$", phase difference "$\theta$", and scalar product "$[s_1][s_2]^H$".

How the disposition of the connection portions 103a to 103f as described above makes components of the high frequency signal a input to the transmission line 102a and output to the output transmission lines orthogonal to components of the high frequency signal b input to the transmission line 102b and output to the output transmission lines will be described with reference to FIG. 2 to FIG. 4 and formulae. FIG. 2 is a diagram illustrating disposition and characteristic impedances of transmission lines 101 and 102a to 102f in the present embodiment. The transmission line 101 has a length denoted by "$L_1$" and a characteristic impedance denoted by "$Z_1$". The transmission lines 102a and 102b each have a characteristic impedance denoted by "$Z_0$". The transmission lines 102a and 102b are input transmission lines. The transmission line 102a is assigned an input port Port 1 for high frequency signals, and the transmission line 102b is assigned an input port Port 2 for high frequency signals. A distance from the connection portion 103a to the connection portion 103b along the transmission line 101 is denoted by "$d_{12}$". The transmission lines 102c, 102d, 102e, and 102f each have a characteristic impedance denoted by "$Z_2$". The transmission lines 102c, 102d, 102e, and 102f are output transmission lines. The transmission line 102c is assigned an output port Port 3 for high frequency signals, the transmission line 102d is assigned an output port Port 4 for high frequency signals, the transmission line 102e is assigned an output port Port 5 for high frequency signals, and the transmission line 102f is assigned an output port Port 6 for high frequency signals. When the characteristic impedances of the transmission lines 101 and 102a to 102f is normalized by the characteristic impedance "$Z_0$" of each of the transmission lines 102a and 102b, a normalized characteristic impedance "$z_1$" of the transmission line 101 is $z_1=Z1/Z_0$, a normalized characteristic impedance "$z_0$" of each of the transmission lines 102a and 102b is $z_0=Z_0/Z_0=1$, and a normalized characteristic impedance "$z_2$" of each of the transmission lines 102c, 102d, 102e, and 102f is $z_2=Z_2/Z_0$.

A distance from the connection portion 103a to the connection portion 103c along the transmission line 101 is denoted by "$d_{13}$", a distance from the connection portion 103c to the connection portion 103d along the transmission line 101 is denoted by "$d_{34}$", a distance from the connection portion 103d to the connection portion 103e along the transmission line 101 is denoted by "$d_{45}$", a distance from the connection portion 103e to the connection portion 103f along the transmission line 101 is denoted by "$d_{56}$", and a distance from the connection portion 103f to the connection portion 103c along the transmission line 101 is denoted by "$d_{63}$". For ease of description, the length "$L_1$" of the transmission line 101 is made equal to a guide wavelength "λ" of the transmission line 101. Assume that the connection portions 103a and 103b are separated from each other along the transmission line 101 by approximately the quarter of the length of the transmission line 101. Assume that the connection portions 103c, 103d, 103e, and 103f divide the length of the transmission line 101 evenly. In this case, a relation between the guide wavelength "λ", the distance "$d_{12}$", the distance "$d_{34}$", the distance "$d_{45}$", the distance "$d_{56}$", and the distance "$d_{63}$" is expressed by the following Formula (1).

[Formula 1]

$$d_{12}=d_{34}=d_{45}=d_{56}=d_{63}=\lambda/4 \quad (1)$$

In accordance with a length from a connection point of an input transmission line to a connection point of an output transmission line along transmission line 101, a phase difference "θ" occurs between a phase of a high frequency signal input to the input transmission line and a phase of a high frequency signal output to the output transmission line. The phase difference "θ" occurs in both of the high frequency signal a input to the transmission line 102a and the high frequency signal b input to the transmission line 102b. The phase difference "θ" is expressed by the following Formula (2).

[Formula 2]

$$\theta=2\pi d_{13}/\lambda \quad (2)$$

In the present embodiment, the phase difference "θ" is converted from the distance from the connection portion 103a to the connection portion 103c along the transmission line 101. At this time, a normalized admittance matrix "[y]" of the power divider 100, which is a matrix relating to ratios between currents and voltages of the transmission lines 102a to 102f, is expressed by the following Formula (3).

[Formula 3]

$$[y]=\frac{j}{z_1}\begin{bmatrix} -\cot\theta-\tan\theta & 0 & \csc\theta & \sec\theta & 0 & 0 \\ 0 & -\cot\theta-\tan\theta & 0 & \csc\theta & \sec\theta & 0 \\ \csc\theta & 0 & -\cot\theta & 0 & 0 & 1 \\ \sec\theta & \csc\theta & 0 & -\cot\theta-\tan\theta & 0 & 0 \\ 0 & \sec\theta & 0 & 0 & -\tan\theta & 1 \\ 0 & 0 & 1 & 0 & 1 & 0 \end{bmatrix} \quad (3)$$

In a case where high frequency signals are input to the transmission lines 102a and 102b, an S parameter matrix "[S]" of the power divider 100, which is a matrix relating to complex amplitudes of high frequency signals output to the transmission lines 102a to 102f, is expressed using the normalized admittance matrix "[y]" of the power divider 100 as the following Formula (4). The S parameter matrix "[S]" contains matrix components relating to complex amplitudes of high frequency signals output to the transmission line 102a and the transmission line 102b because the high frequency signal can be output to the transmission lines 102a and 102b being the input transmission lines. The complex amplitude of the high frequency signal relates to an electric power of the high frequency signal.

[Formula 4]

$$[S]=[g_{ref}]([I]-[z_{ref}][y])([I]+[z_{ref}][y])^{-1}[g_{ref}]^{-1} \quad (4)$$

In Formula (4), "$[g_{ref}]$" is expressed by the following Formula (5), and "$[z_{ref}]$" is expressed by the following Formula (6). In addition, "[I]" denotes the identity matrix.

[Formula 5]

$$[g_{ref}]=\text{diag}(1,1,1/\sqrt{z_2},1/\sqrt{z_2},1/\sqrt{z_2},1/\sqrt{z_2}) \quad (5)$$

[Formula 6]

$$[z_{ref}]=\text{diag}(1,1,z_2,z_2,z_2,z_2) \quad (6)$$

For further simplification of the formulae, a case where θ=0° will be described below. The case where θ=0° refers to a case where the connection portion 103a and the connection portion 103c are at the same place. FIG. 3 is a diagram illustrating a configuration of a power divider 100' of which connection portions 103a and 103c are at the same place. FIG. 3A is a solid view of the power divider 100', and FIG. 3B is an xy plan of the power divider 100'. In the power divider 100', connection portions 103b and 103d are also at the same place. Here, in a case where a high frequency signal is input to the transmission line 102a being an input transmission line, an S parameter matrix "[S]" relating to complex amplitudes of high frequency signals output to the transmission lines 102a to 102f contains components "$S_{m1}$" (m=1, 2, . . . , 6) that are expressed by the following Formula (7). In the case where the high frequency signal a is input to the transmission line 102a, a component "$S_{11}$" denotes a complex amplitude of the high frequency signal output to the transmission line 102a, a component "$S_{21}$" denotes a complex amplitude of the high frequency signal output to the transmission line 102b, a component "$S_{31}$" denotes a complex amplitude of a high frequency signal output to the transmission line 102c, a component "$S_{41}$" denotes a complex amplitude of a high frequency signal output to the transmission line 102d, a component "$S_{51}$" denotes a complex amplitude of a high frequency signal output to the transmission line 102e, and a component "$S_{61}$" denotes a complex amplitude of a high frequency signal output to the transmission line 102f.

[Formula 7]

$$S_{11}=(z_1^2 z_2^2+z_2^4-z_1^2-4z_2^2)/\Delta_0$$

$$S_{21}=-j2z_1 z_2^2/\Delta_0$$

$$S_{31}=2\sqrt{z_2}(z_1^2 z_2+z_2^3+z_1^2+2z_2^2)/\Delta_0$$

$$S_{41}=-j2z_1 z_2\sqrt{z_2}/\Delta_0$$

$$S_{51}=-2z_2{}^2\sqrt{z_2}(z_2+2)/\Delta_0$$

$$S_{61}=-j2z_1z_2\sqrt{z_2}(z_2+1)/\Delta_0 \quad (7)$$

Since "$S_{11}$" denotes the complex amplitude of the signal output to the transmission line 102a being an input source, "$S_{11}$" indicates that part of the high frequency signal a can be output to the transmission line 102a. "$S_{21}$" indicates that part of the high frequency signal input to the transmission line 102a can be output to the transmission line 102b, which is the other input transmission line. Output of a high frequency signal to a transmission line being an input source is also called reflection. The high frequency signal output to an input transmission line gives rise to a loss. Therefore, the high frequency signal output to the input transmission line is desirably suppressed. Here, "$\Delta_0$" is expressed by the following Formula (8).

[Formula 8]

$$\Delta_0=z_1{}^2z_2{}^2+z_2{}^4+2z_1{}^2z_2+4z_2{}^3+z_1{}^2+4z_2{}^2 \quad (8)$$

In a case where a high frequency signal is input to the transmission line 102b being the other input transmission line, the S parameter matrix "[S]" contains components "$S_{m2}$" (m=1, 2, . . . , 6) that are expressed by the following Formula (9). In the case where the high frequency signal b is input to the transmission line 102b, a component "$S_{12}$" denotes a complex amplitude of the high frequency signal output to the transmission line 102a, a component "$S_{22}$" denotes a complex amplitude of the high frequency signal output to the transmission line 102b, a component "$S_{32}$" denotes a complex amplitude of a high frequency signal output to the transmission line 102c, a component "$S_{42}$" denotes a complex amplitude of a high frequency signal output to the transmission line 102d, a component "$S_{52}$" denotes a complex amplitude of a high frequency signal output to the transmission line 102e, and a component "$S_{62}$" denotes a complex amplitude of a high frequency signal output to the transmission line 102f.

[Formula 9]

$$S_{12}=-j2z_1z_2{}^2/\Delta_0$$

$$S_{22}=(z_1{}^2z_2{}^2+z_2{}^4-z_1{}^2-4z_2{}^2)/\Delta_0$$

$$S_{32}=-j2z_1z_2\sqrt{z_2}/\Delta_0$$

$$S_{42}=2\sqrt{z_2}(z_1{}^2z_2+z_2{}^3+z_1{}^2+2z_2{}^2)/\Delta_0$$

$$S_{52}=-j2z_1z_2\sqrt{z_2}(z_2+1)/\Delta_0$$

$$S_{62}=-2z_2{}^2\sqrt{z_2}(z_2+2)/\Delta_0 \quad (9)$$

"$S_{21}$" indicates that part of the high frequency signal input to the transmission line 102b can be output to the transmission line 102a, which is the other input transmission line. "$S_{22}$" denotes the complex amplitude of the signal output to the transmission line 102b being an input source, thus indicating that the input high frequency signal can be reflected. Let "$[s_1]$" denote a vector of high frequency signals output to the transmission lines 102c to 102f in a case where a high frequency signal is input to the transmission line 102a, and let "$[s_2]$" denote a vector of high frequency signals output to the transmission lines 102c to 102f in a case where a high frequency signal is input to the transmission line 102b. The vector "$[s_1]$" and the vector "$[s_2]$" are expressed by Formula (10). The vector "$[s_1]$" contains a component "$S_{31}$", a component "$S_{41}$", a component "$S_{51}$", and a component "$S_{61}$" in Formula (7), and the vector "$[s_2]$" contains a component "$S_{32}$", a component "$S_{42}$", a component "$S_{52}$", and a component "$S_{62}$" in Formula (9).

[Formula 10]

$$[s_1]=[S_{31}S_{41}S_{51}S_{61}]$$

$$[s_2]=[S_{32}S_{42}S_{52}S_{62}] \quad (10)$$

At this time, the vector "$[s_1]$" and vector "$[s_2]$" make a scalar product "$[s_1][s_2]^H$" expressed by Formula (11). Note that "$[\ ]^H$" denotes the Hermitian transpose.

[Formula 11]

$$[s_1][s_2]^H=0 \quad (11)$$

As expressed by Formula (11), when the phase difference θ=0°, the scalar product "$[s_1][s_2]^H$" is 0 irrespective of the normalized characteristic impedance "$z_2$" of each output transmission line. That is, components of the high frequency signal a input to the transmission line 102a and output to the at least two of the output transmission lines are orthogonal to components of the high frequency signal b input to the transmission line 102b and output to at least two of the output transmission lines.

Although the case where θ=0° is described for ease of the description of the component "$S_{m1}$" and the component "$S_{m2}$", the scalar product "$[s_1][s_2]^H$" is 0 as long as the normalized characteristic impedance "$z_1$" of the transmission line 101 satisfies $z_1$=0. This holds true irrespective of the normalized characteristic impedance "$z_2$" of each output transmission line and the phase difference "θ". FIG. 4 illustrates a relation among the normalized characteristic impedance "$z_1$" of the transmission line 101, the phase difference "θ", and the scalar product "$[s_1][s_2]^H$". FIG. 4 shows that, as the phase difference "θ" comes close to 0° or 90°, the scalar product "$[s_1][s_2]^H$" comes close to 0, and as the normalized characteristic impedance "$z_1$" of the transmission line 101 comes close to 0, the scalar product "$[s_1][s_2]^H$" comes close to 0.

Figure 5:
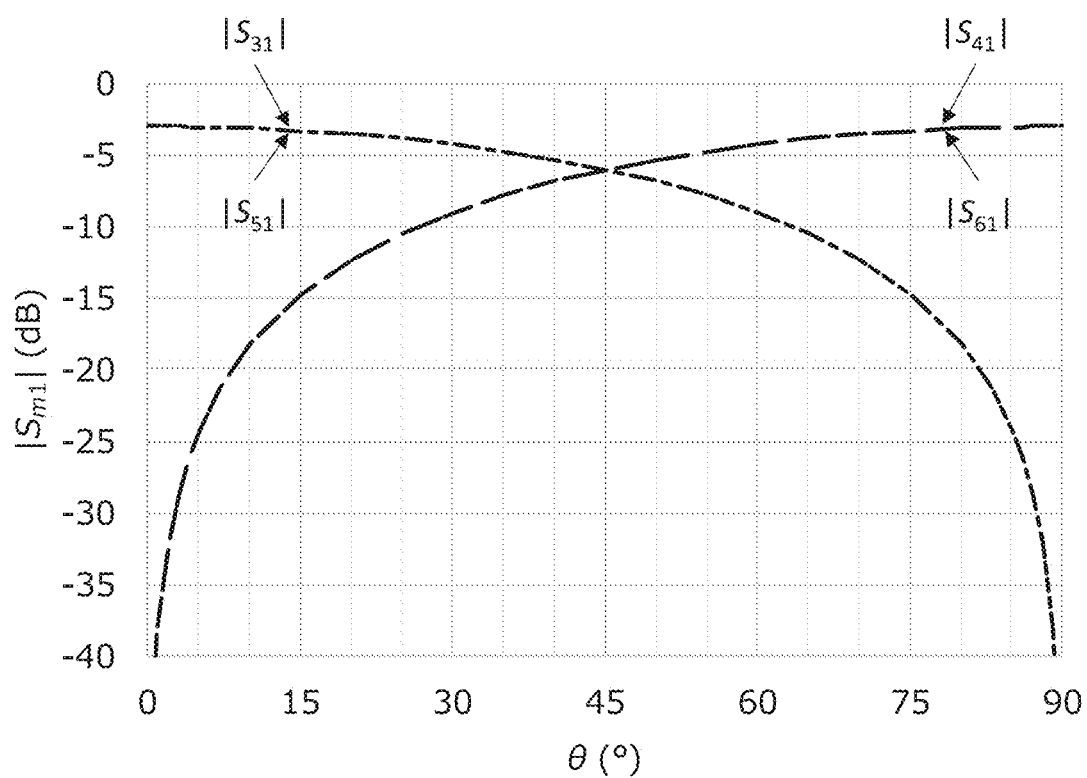
FIG. 5 is a graph illustrating calculations of amplitudes "$|S_{31}|$", "$|S_{41}|$", "$|S_{51}|$", and "$|S_{61}|$" in accordance with the phase difference "$\theta$"

The above description is given about the case where the phase difference θ=0°. The normalized characteristic impedance "$z_1$" of the transmission line 101 satisfying $z_1$=0 makes the scalar product "$[s_1][s_2]^H$" zero. In contrast, in a case where the normalized characteristic impedance "$z_2$" of each output transmission line has a given value, components of high frequency signals output to the output transmission lines vary in accordance with the phase difference "θ". FIG. 5 is a graph illustrating calculations of amplitudes "$|S_{31}|$", "$|S_{41}|$", "$|S_{51}|$", and "$|S_{61}|$" in accordance with the phase difference "θ" in a case where the high frequency signal a is input with $z_1$=0 and $z_2$=2. In this case, amplitudes "$|S_{11}|$" and "$|S_{21}|$" are zero irrespective of the phase difference "θ" from Formula (7). FIG. 5 shows that, when the phase difference "θ" ranges from 0° to 45°, the amplitudes "$|S_{31}|$" and "$|S_{51}|$" are larger than the amplitudes "$|S_{41}|$" and "$|S_{61}|$". This indicates that the high frequency signal a is output mainly to the transmission lines 102c and 102e. When the phase difference "θ" is approximately 45°, the amplitudes "$|S_{31}|$", "$|S_{41}|$", "$|S_{51}|$", "$|S_{61}|$" are all at the same level. In this case, the high frequency signal a is output to the transmission lines 102c to 102f in a form of high frequency signals equal in amplitude. Note that being equal in amplitude is not limited to being exactly equal in amplitude but can be being at the same level (electric power level). When the phase difference "θ" ranges from 45° to 90°, the amplitudes "$|S_{31}|$" and "$|S_{51}|$" are smaller than the amplitudes "|S$_{41}$|" and "|S$_{61}$|". This indicates that the high frequency signal a is output mainly to the transmission lines 102d and 102f.

As described above, the amplitude of the high frequency signal a for each output destination changes in accordance with the phase difference "θ". Therefore, the components of the high frequency signals output to the output transmission lines vary in accordance with the phase difference "θ". Similarly, an amplitude of the high frequency signal b for each output destination also changes in accordance with the phase difference "θ" but its tendency of the change is opposite to that of the high frequency signal a. That is, when the phase difference "θ" ranges from 0° to 45°, amplitudes "|S$_{42}$|" and "|S$_{62}$|" are larger than the amplitudes "|S$_{32}$|" and "|S$_{52}$|". This indicates that the high frequency signal b is output mainly to the transmission lines 102d and 102f. When the phase difference "θ" is approximately 45°, the amplitudes "|S$_{32}$|", "|S$_{42}$|", "|S$_{52}$|", "|S$_{62}$|" are all at the same level. The high frequency signal b is output to the transmission lines 102c to 102f in a form of high frequency signals equal in amplitude. When the phase difference "θ" ranges from 45° to 90°, the amplitudes "|S$_{42}$|" and "|S$_{62}$|" are smaller than the amplitudes "|S$_{32}$|" and "|S$_{52}$|". This indicates that the high frequency signal b is output mainly to the transmission lines 102c and 102e. Amplitudes "|S$_{12}$|" and "|S$_{22}$|" are zero irrespective of the phase difference "θ" from Formula (9).

As shown in Formula (7) and Formula (9), in a case of $z_1=0$, the amplitudes "|S$_{11}$|", "|S$_{12}$|", "|S$_{21}$|" and "|S$_{22}$|" are 0. Therefore, the high frequency signals output to the input transmission lines are suppressed. The high frequency signal a and the high frequency signal b are output to the output transmission lines, enhancing an efficiency of the division of the high frequency signals.

Since the normalized characteristic impedance "$z_1$" of the transmission line 101 is defined as $z_1=Z_1/Z_0$, $z_1=0$ results in $Z_1=0$. However, "$Z_1$" cannot be actually made zero since "$Z_1$" is the characteristic impedance of the transmission line 101. Although $z_1=0$ cannot be provided, decreasing "$z_1$" can bring the scalar product "$[s_1][s_2]^H$" close to 0. Even in a case where the scalar product "$[s_1][s_2]^H$" is close to zero, the components of the high frequency signal a input to the transmission line 102a and output to the at least two of the output transmission lines are considered to be orthogonal to the components of the high frequency signal b input to the transmission line 102b and output to at least two of the output transmission lines. A scalar product "$[s_1][s_2]^H$" that allows the components of the high frequency signal a to be considered to be orthogonal to the components of the high frequency signal b differs depending on an application to which the power divider 100 is applied. An example, with the scalar product "$[s_1][s_2]^H$" being approximately 0.3, interference between the division of the high frequency signal a and the division of the high frequency signal b (hereinafter, the interference will be also referred to as internode interference) can be reduced, allowing the components of the high frequency signal a to be considered to be orthogonal to the components of the high frequency signal b. In FIG. 4, the scalar product "$[s_1][s_2]^H$" is 0.1 or less, and thus the components of the high frequency signal a are orthogonal to the components of the high frequency signal b.

As seen from the above, spacing the connection portions 103a and 103b from each other along the transmission line 101 by approximately the quarter of the length of the transmission line 101 and disposing the connection portions 103c, 103d, 103e, and 103f such that they divide the length of the transmission line 101 substantially evenly enable the polarized waves to be used in combination.

In addition, in the case where the phase difference θ=0°, by setting the normalized characteristic impedance "$z_1$" of the transmission line 101 as $z_1=0$ and by setting the normalized characteristic impedance "$z_2$" of each output transmission line as $z_2=2$, the high frequency signal a input to the transmission line 102a and the high frequency signal b input to the transmission line 102b can be output to the output transmission lines different from each other. Note that the case of the output to the output transmission lines different from each other refers to a case where the phase difference θ=0°, where the connection portion 103a and the connection portion 103c are at the same place, and the connection portion 103b and the connection portion 103d are at the same place, as illustrated in FIG. 3.

The high frequency signals input to the different input transmission lines being output to the different output transmission lines make it possible to further reduce the interference between the high frequency signals in the division of the high frequency signals. In addition, the high frequency signal a input to the transmission line 102a and the high frequency signal b input to the transmission line 102b can reduce a high frequency signal output to at least one of the transmission line 102a and the transmission line 102b. Setting the normalized characteristic impedance "$z_2$" of each output transmission line as $z_2=2$ indicates that the characteristic impedance "$Z_2$" of each output transmission line is twice the characteristic impedance "$Z_0$" of each input transmission line. This will be described with reference to formulae. From Formula (7), the component "$S_{m1}$" when $z_1=0$ and $z_2=2$ is expressed by Formula (12).

[Formula 12]

$$S_{11}=S_{21}=S_{41}=S_{61}=0$$

$$S_{31}=-S_{51}=1/\sqrt{2} \tag{12}$$

Formula (12) shows that, when $z_1=0$ and $z_2=2$, the high frequency signal a input to the transmission line 102a is output to the transmission lines 102c and 102e and is not output to the transmission lines 102a, 102b, 102d, and 102f. Formula (12) also shows that the high frequency signal output to the transmission line 102c is in opposite phase to the high frequency signal output to the transmission line 102e. Note that not being output does not mean that the high frequency signal is not output at all but means that an amplitude of the high frequency signal is small when compared with an amplitude of the high frequency signal output to a transmission line to which the high frequency signal is supposed to be output, that is, meaning that the high frequency signal having the small amplitude resists being output. In this case, the high frequency signal a may be output to the transmission lines 102a, 102b, 102d, and 102f but an amplitude of the high frequency signal a output to the transmission lines 102a, 102b, 102d, and 102f is smaller than an amplitude of the high frequency signal a output to the transmission lines 102c and 102e. Note that being in opposite phase does not mean that the phase is not completely opposite, but the phase may be substantially opposite.

From Formula (9), the component "$S_{m2}$" when $z_1=0$ and $z_2=2$ is expressed by Formula (13).

[Formula 13]

$$S_{12}=S_{22}=S_{32}=S_{52}=0$$

$$S_{42}=-S_{62}=1/\sqrt{2} \qquad (13)$$

Formula (13) shows that, when $z_1=0$ and $z_2=2$, the high frequency signal b input to the transmission line 102b is output to the transmission lines 102d and 102f and is not output to the transmission lines 102a, 102b, 102c, and 102e. Formula (13) also shows that the high frequency signal output to the transmission line 102d is in opposite phase to the high frequency signal output to the transmission line 102f. As with the description with reference to Formula (12), the high frequency signal b may be output to the transmission lines 102a, 102b, 102c, and 102e but an amplitude of the high frequency signal b output to the transmission lines 102a, 102b, 102c, and 102e is smaller than an amplitude of the high frequency signal b output to the transmission lines 102d and 102f. Although the description with reference to Formula (12) and Formula (13) is such that the high frequency signal a and the high frequency signal b are output to the different output transmission lines, the present embodiment is not limited to a case where the whole high frequency signal a and the whole high frequency signal b are output to the different output transmission lines. For example, the high frequency signal a may be output also to the transmission lines 102d and 102f, but an amplitude of the output high frequency signal a is smaller than an amplitude of a signal of the high frequency signal b output to the transmission lines 102d and 102f. Such a case is also included in the case where the high frequency signal a and the high frequency signal b are output to the different output transmission lines.

The above description demonstrates that, in the case where the phase difference $\theta=0°$, the normalized characteristic impedance "$z_1$" of the transmission line 101 is set as $z_1=0$, and the normalized characteristic impedance "$z_2$" of each output transmission line is set as $z_2=2$, the high frequency signal a input to the transmission line 102a is output to the transmission lines 102c and 102e, and the high frequency signal b input to the transmission line 102b is output to the transmission lines 102d and 102f. That is, the power divider 100 can cause the high frequency signal a input to the transmission line 102a and the high frequency signal b input to the transmission line 102b to be output to the output transmission lines different from each other. The power divider 100 can restrain the high frequency signal a input to the transmission line 102a from being output to the input transmission lines and the high frequency signal b input to the transmission line 102b from being output to the input transmission lines.

Figure 6:
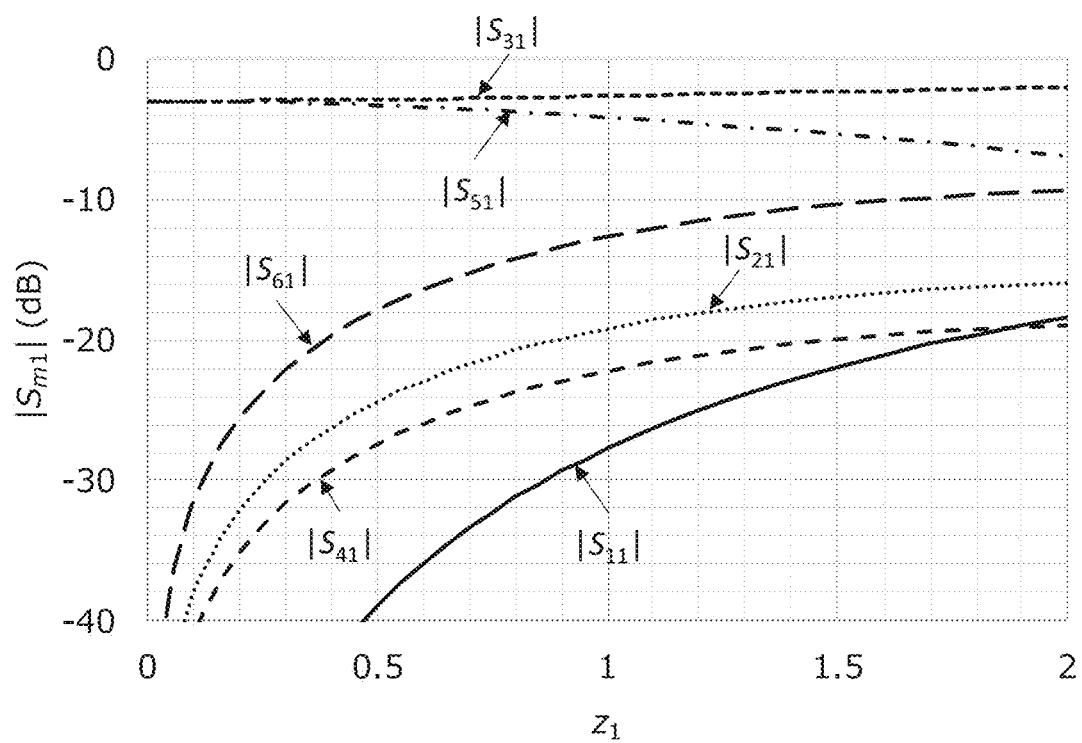
FIG. 6 is a graph illustrating calculations of amplitudes "$|S_{m1}|$" of components "$S_{m1}$" in accordance with the normalized characteristic impedance "$z_1$"

The normalized characteristic impedance "$z_1$" of the transmission line 101 cannot be actually made zero. Decreasing "$z_1$" can restrain the high frequency signal input to the transmission line 102a or 102b from being output to the transmission lines 102a and 102b. FIG. 6 illustrates calculations of amplitudes "|$S_{m1}$|" of the components "$S_{m1}$" in accordance with "$z_1$" when the phase difference "$\theta$" is set as $\theta=0°$, and the normalized characteristic impedance "$z_2$" of each output transmission line is set as $z_2=2$. From FIG. 6, the amplitudes "|$S_{11}$|", "|$S_{21}$|", "|$S_{41}$|", and "|$S_{61}$|" decrease as "$z_1$" is decreased to close to zero. That is, decreasing "$z_1$" to close to zero can restrain the high frequency signal input to the transmission line 102a from being output to the transmission lines 102a and 102b. The decreasing of "$z_1$" to close to zero decreases the amplitudes "|$S_{41}$|" and "|$S_{61}$|" and thus can restrain the high frequency signal a input to the transmission line 102a from being output to the transmission lines 102d and 102f. This agrees with the description with reference to Formula (12). On the other hand, "|$S_{31}$|" and "|$S_{51}$|" vary little despite of the decreasing of "$z_1$" to close to zero, and thus the high frequency signal a input to the transmission line 102a are to be output to the transmission lines 102c and 102e. This agrees with the description with reference to Formula (12).

Similarly, in the case of the high frequency signal b input to the transmission line 102b, the amplitudes "|$S_{12}$|", "|$S_{22}$|", "|$S_{32}$|", and "|$S_{52}$|" decrease as "$z_1$" is decreased to close to zero. That is, decreasing "$z_1$" to close to zero can restrain the high frequency signal b input to the transmission line 102b from being output to the transmission lines 102a and 102b. Since the amplitudes "|$S_{32}$|" and "|$S_{52}$|" are decreased, the high frequency signal b input to the transmission line 102b can be restrained from being output to the transmission lines 102c and 102e. This agrees with the description with reference to Formula (13). On the other hand, "|$S_{42}$|" and "|$S_{62}$|" vary little despite of the decreasing of "$z_1$" to close to zero, and thus the high frequency signal b input to the transmission line 102b are to be output to the transmission lines 102d and 102f. This agrees with the description with reference to Formula (13).

How close "$z_1$" can be brought to $z_1=0$ depends also on an application to which the power divider 100 is applied. As an example, in a case of $z_1=1$, FIG. 6 shows amplitude |$S_{11}$|=−27 dB, amplitude |$S_{21}$|=−19 dB, amplitude |$S_{41}$|=−22 dB, and amplitude |$S_{61}$|=−13 dB, which are lower than amplitude |$S_{31}$|=−3 dB and amplitude |$S_{51}$|=−5 dB by at least 10 dB. Accordingly, even when $z_1=1$, the high frequency signal a input to the transmission line 102a and the high frequency signal b input to the transmission line 102b can be output to the different output transmission lines and can be restrained from being output to the input transmission lines.

A case of $z_1=0.5$ results in amplitude |$S_{11}$|=−39 dB, amplitude |$S_{21}$|=−24 dB, amplitude |$S_{41}$|=−27 dB, and amplitude |$S_{61}$|=−17 dB, which are lower than amplitude |$S_{31}$|=−3 dB and amplitude |$S_{51}$|=−3 dB by at least 14 dB. As compared with the example in which $z_1=1$, bringing "$z_1$" close to $z_1=0$ can cause the high frequency signal a and the high frequency signal b to be output to the different output transmission lines and can restrain the high frequency signal a and the high frequency signal b from being output to the input transmission lines.

Figure 7:
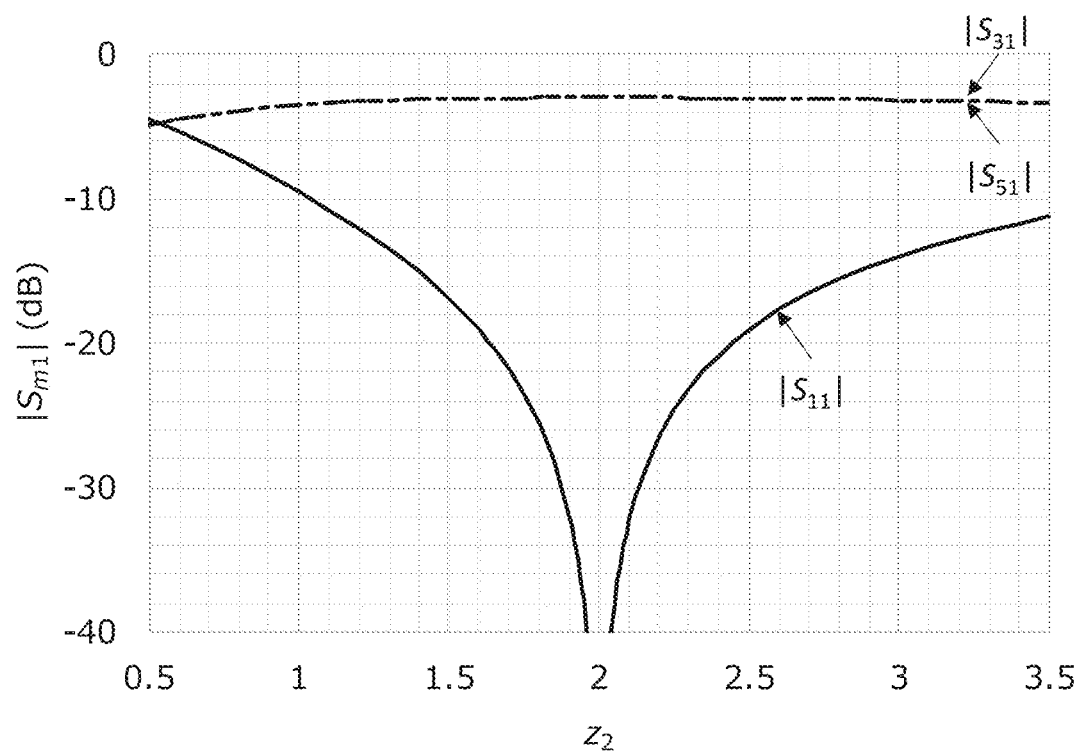
FIG. 7 is a graph illustrating calculations of amplitudes "$|S_{11}|$", "$|S_{31}|$", and "$|S_{51}|$" in accordance with a normalized characteristic impedance "$z_2$"

The above description is given about the case of $\theta=0°$, $z_1=0$, and $z_2=2$. The following description will be made about how to restrain the reflection with "$z_2$" not being $z_2=2$, by bringing "$z_2$" close to $z_2=2$. FIG. 7 is a graph illustrating calculations of the amplitudes "|$S_{11}$|", "|$S_{31}$|", and "|$S_{51}$|" in accordance with "$z_2$" in the case where the high frequency signal a is input to the transmission line 102a. The amplitude "|$S_{11}$|" indicates an amplitude of the reflected high frequency signal a. FIG. 7 shows that bringing "$z_2$" to close to $z_2=2$ decreases the amplitude "|$S_{11}$|" and thus can restrain the high frequency signal a input to the transmission line 102a from being reflected to be output to the transmission line 102a. On the other hand, the amplitudes "|$S_{31}$|" and "|$S_{51}$|" vary little despite of the bringing of "$z_2$" to close to $z_2=2$, and thus the high frequency signal a input to the transmission line 102a are to be output to the transmission lines 102c and 102e. This agrees with the description with reference to Formula (12).

Similarly, in the case of the high frequency signal b input to the transmission line 102b, the amplitude "|$S_{22}$|" decreases as "$z_2$" is brought close to $z_2=2$. That is, the high frequency signal b input to the transmission line 102b can be restrained from being reflected to be output to the transmission line 102b. On the other hand, the amplitudes "|$S_{42}$|" and "|$S_{62}$|" vary little despite of the bringing of "$z_2$" to close to $z_2$=2, and thus the high frequency signal b input to the transmission line 102b are to be output to the transmission lines 102d and 102f. This agrees with the description with reference to Formula (13).

The normalized characteristic impedance "$z_2$" of each output transmission line is determined in accordance with how much the reflection needs to be restrained. For example, from FIG. 7, to bring the amplitude "|$S_{11}$|" to not more than −10 dB, "$z_2$" ranges from 1.1 to 3.5 times. That is, the characteristic impedance "$Z_2$" of each output transmission line is to range from 1.1 to 3.5 times as much as the characteristic impedance "$Z_0$" of each input transmission line. To bring the amplitude |$S_{11}$| to not more than −20 dB, $z_2$ ranges from 1.63 to 2.45 times. That is, the characteristic impedance "$Z_2$" of each output transmission line is to range from 1.63 to 2.45 times as much as the characteristic impedance "$Z_0$" of each input transmission line. To bring the amplitude "|$S_{11}$|" to not more than −30 dB, "$z_2$" ranges from 1.87 to 2.14 times. That is, the characteristic impedance "$Z_2$" of each output transmission line is to range from 1.87 to 2.14 times as much as the characteristic impedance "$Z_0$" of each input transmission line.

The power divider 100 according to the present embodiment is described. The power divider 100 described in the present embodiment is an example, and its modifications can be implemented and carried out variously. Modifications of the present embodiment will be described below. The modifications can be used in combination with the description of the present embodiment.

(Modification 1)

Figure 8:
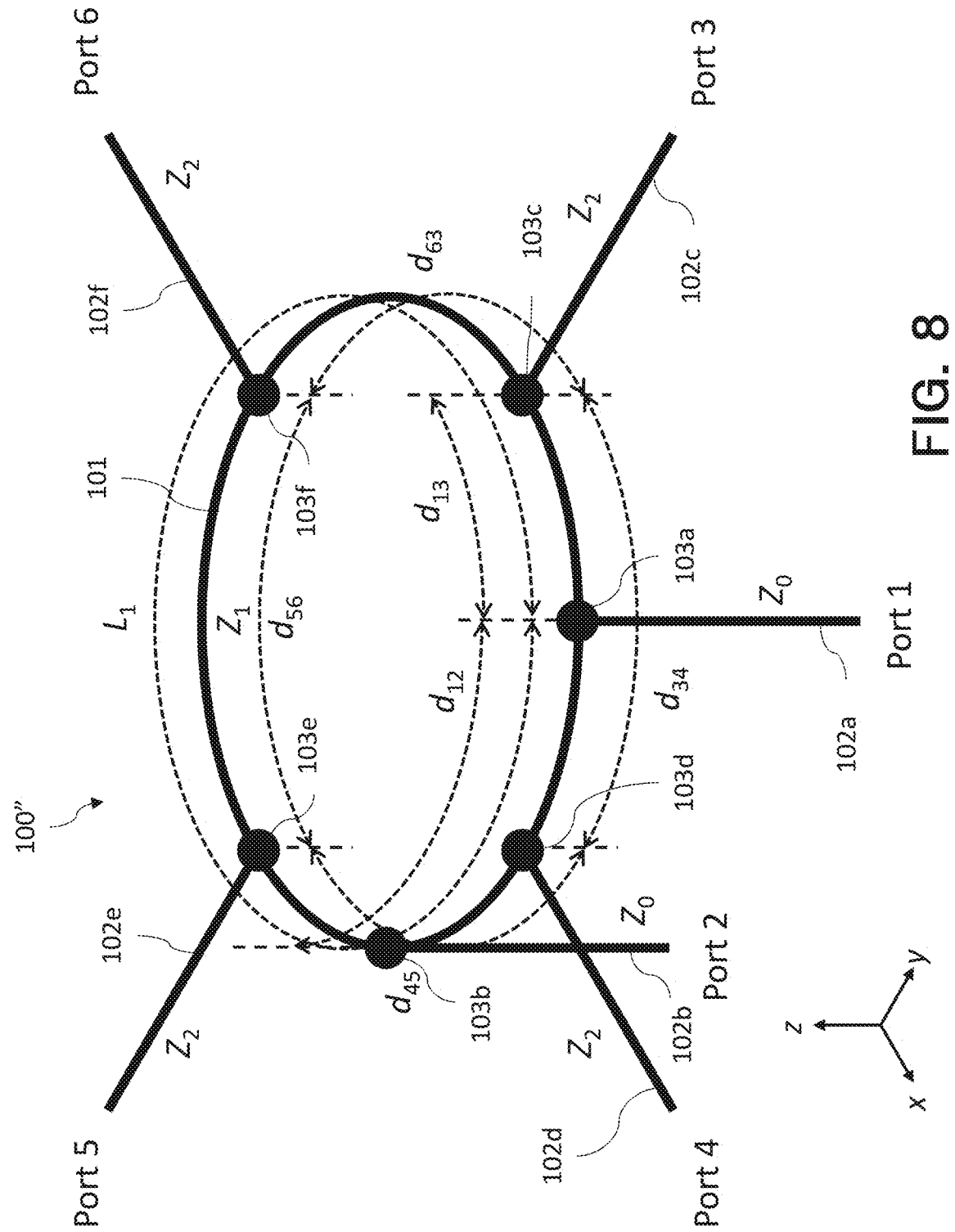
FIG. 8 is an arrangement plan of the transmission lines 101 and 102a to 102f in a modification of the first embodiment.

The present embodiment is described about the case where the normalized characteristic impedance "$z_1$" of the transmission line 101 is set as $z_1$=0, and the normalized characteristic impedance "$z_2$" of each output transmission line is set as $z_2$=2, with the phase difference "θ" set as θ=0°. As a modification, a case where the phase difference "θ" is set as θ=45° will be described. FIG. 8 is a diagram illustrating disposition and characteristic impedances of transmission lines 101 and 102a to 102f of a power divider 100″ in a case where the phase difference "θ" is set as θ=45°. The characteristic impedances of transmission lines 101 and 102a to 102f are the same as in the present embodiment. In the case where the phase difference "θ" is θ=45°, the connection portion 103a is located at a middle point between the connection portions 103c and 103d along the transmission line 101, and the connection portion 103b is located at a middle point between the connection portions 103d and 103e along the transmission line 101. That is, lengths from the connection portion 103a to the connection portions 103c to 103f along the transmission line 101 are integer multiples of about one eighth of the length of the transmission line 101. Similarly, lengths from the connection portion 103b to the connection portions 103c to 103f along the transmission line 101 are integer multiples of about one eighth of the length of the transmission line 101.

As described with reference to FIG. 4, as long as $z_1$=0 is satisfied, the scalar product "$[s_1][s_2]^H$" satisfies $[s_1][s_2]^H$=0 irrespective of "$z_2$" and the phase difference "θ". Therefore, the components of the high frequency signal a input to the transmission line 102a and output to the at least two of the output transmission lines are orthogonal to the components of the high frequency signal b input to the transmission line 102b and output to at least two of the output transmission lines. With the disposition in the present modification, as long as $z_1$=0 and $z_2$=2, Formula (14) is established irrespective of the phase difference "θ".

[Formula 14]

$$S_{11}=S_{21}=0$$

$$S_{31}=S_{41}=-S_{51}=-S_{61}=\tfrac{1}{2}$$

$$S_{12}=S_{22}=0$$

$$-S_{32}=S_{42}=S_{52}=-S_{62}=\tfrac{1}{2} \quad (14)$$

Formula (14) shows that the high frequency signal a input to the transmission line 102a is not output to the input transmission lines but is output to the transmission lines 102c to 102f in a form of high frequency signals equal in amplitude. In this case, the high frequency signals output to the transmission lines 102c and 102d are in opposite phase to the high frequency signals output to the transmission lines 102e and 102f. The high frequency signal b input to the transmission line 102b is not output to the input transmission lines but is output to the transmission lines 102c to 102f in a form of high frequency signals equal in amplitude. In this case, the high frequency signals output to the transmission lines 102c and 102f are in opposite phase to the high frequency signals output to the transmission line 102d and the transmission line 102e.

As in the present embodiment, the normalized characteristic impedance $z_1$ of the transmission line 101 actually cannot be zero. However, by bringing "$z_1$" close to $z_1$=0 brings the scalar product "$[s_1][s_2]^H$" close to $[s_1][s_2]^H$=0. Accordingly, the components of the high frequency signal a input to the transmission line 102a and output to the at least two of the output transmission lines can be considered to be orthogonal to the components of the high frequency signal b input to the transmission line 102b and output to at least two of the output transmission lines.

Figure 9A:
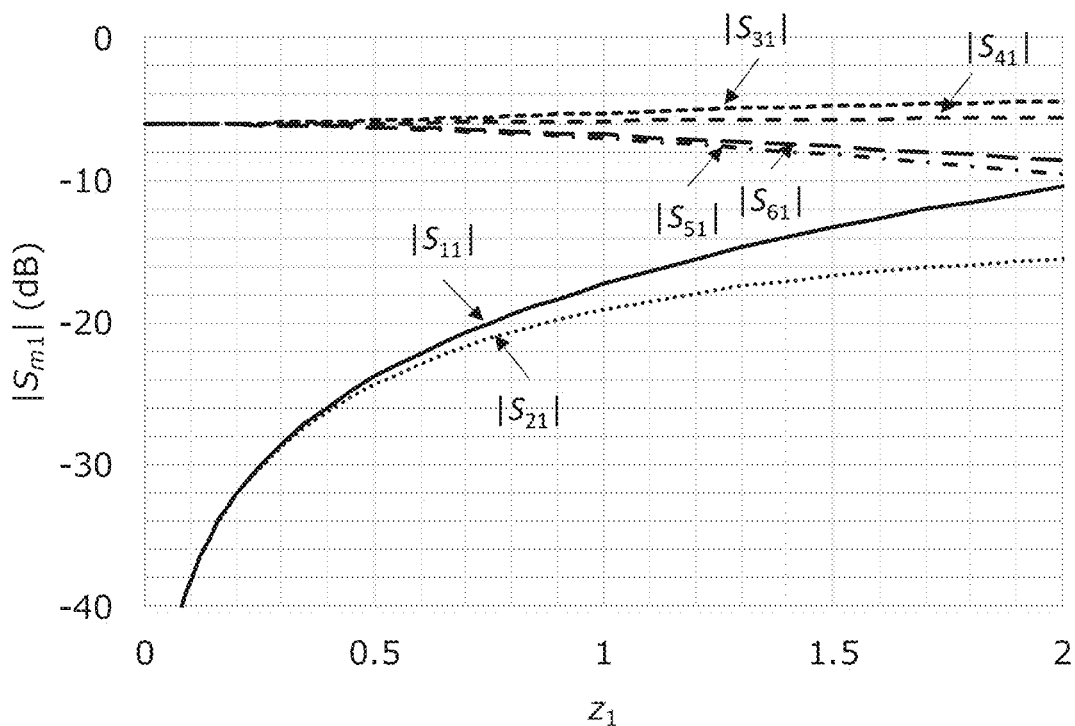
FIG. 9A and FIG. 9B are graphs illustrating a relation among normalized characteristic impedance "$z_1$" and amplitudes "$|S_{m1}|$" or scalar product "$[s_1][s_2]^H$" in the modification of the first embodiment.
Figure 9B:
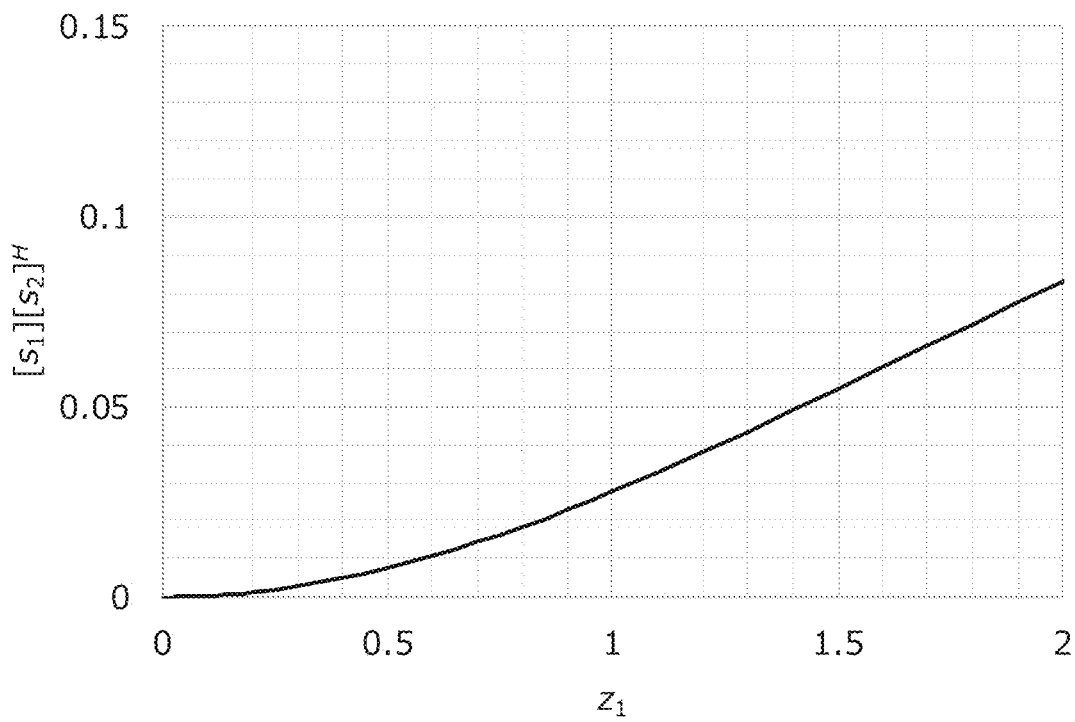

FIG. 9A is a graph illustrating a relation between "$z_1$" and the amplitudes "|$S_{m1}$|" of the high frequency signals output to the transmission lines 102a to 102f in accordance with the high frequency signal a input to the transmission line 102a, and FIG. 9B is a graph illustrating a relation between the "$z_1$" and the scalar product "$[s_1][s_2]^H$", with the phase difference "θ" being θ=45° and the normalized characteristic impedance "$z_2$" of each output transmission line being $z_2$=2.

FIG. 9A shows that the amplitudes "|$S_{11}$|" and "|$S_{21}$|" decrease as "$z_1$" is brought close to $z_1$=0. In contrast, the amplitudes "|$S_{31}$|" and "|$S_{61}$|" are little influenced by "$z_1$" and are at the same level. Amplitudes with which the high frequency signal a is not considered to be output to the input transmission lines depend on an application to which the power divider 100″ is applied. As an example, with $z_1$=1, the amplitude |$S_{11}$|=−17 dB and the amplitude |$S_{21}$|=−19 dB are lower than the amplitudes "|$S_{31}$|" to "|$S_{61}$|" being about −5 to −7 dB by 10 dB or larger. The high frequency signal a is therefore considered not to be output to the input transmission lines. With $z_1$=0.5, the amplitude |$S_{11}$|=−24 dB and the amplitude |$S_{21}$|=−24 dB are lower than the amplitudes "|$S_{31}$|" to "|$S_{61}$|" being about −6 dB by 18 dB or larger. FIG. 9A shows that the high frequency signal a resists being output to the input transmission lines more as "$z_1$" is brought close to $z_1$=0. This holds true for the high frequency signal b, which resists being output to the input transmission lines as "$z_1$" is brought close to $z_1$=0.

FIG. 9B shows that the scalar product "$[s_1][s_2]^H$" comes close to $[s_1][s_2]^H$=0 as "$z_1$" is brought close to $z_1$=0. FIG. 9B is a graph that is FIG. 4 at the phase difference θ=45°. In FIG. 9B, the scalar product "$[s_1][s_2]^H$" is not more than 0.1. Accordingly, the components of the high frequency signal a input to the transmission line 102a and output to the at least two of the output transmission lines can be considered to be orthogonal to the components of the high frequency signal b input to the transmission line 102b and output to at least two of the output transmission lines.

As described above, the modification 1 can provide the power divider 100" that can use the polarized waves in combination even at the phase difference θ=45° and restrains the output to the input transmission lines. Moreover, the power divider 100 can make the amplitudes of the high frequency signal output to the output transmission lines at the same level.
(Modification 2)

A modification 2 is a modification relating to shapes of the transmission line 101 of the power divider 100 and connection between the transmission lines 102a to 102f. The modification 2 will be described.

Figure 10A:
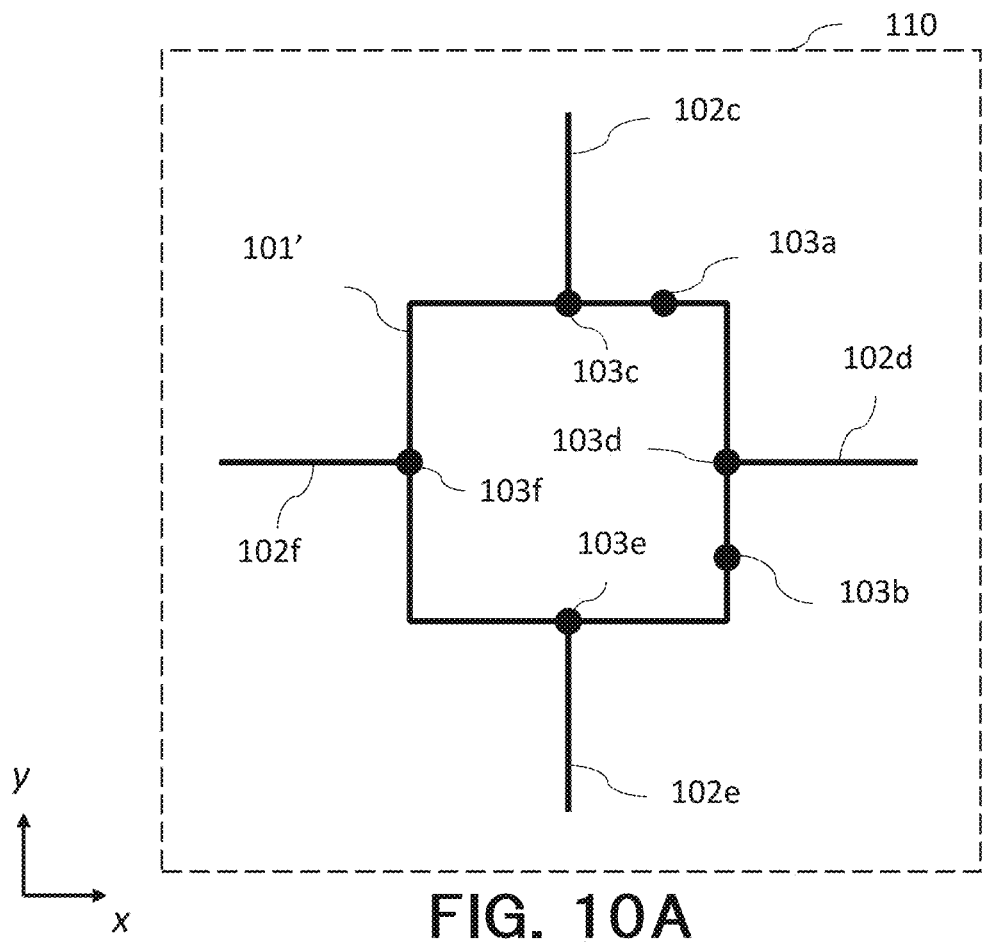
FIG. 10A and FIG. 10B are configuration diagrams of power dividers 110 and 120 applicable to the first embodiment.
Figure 10B:
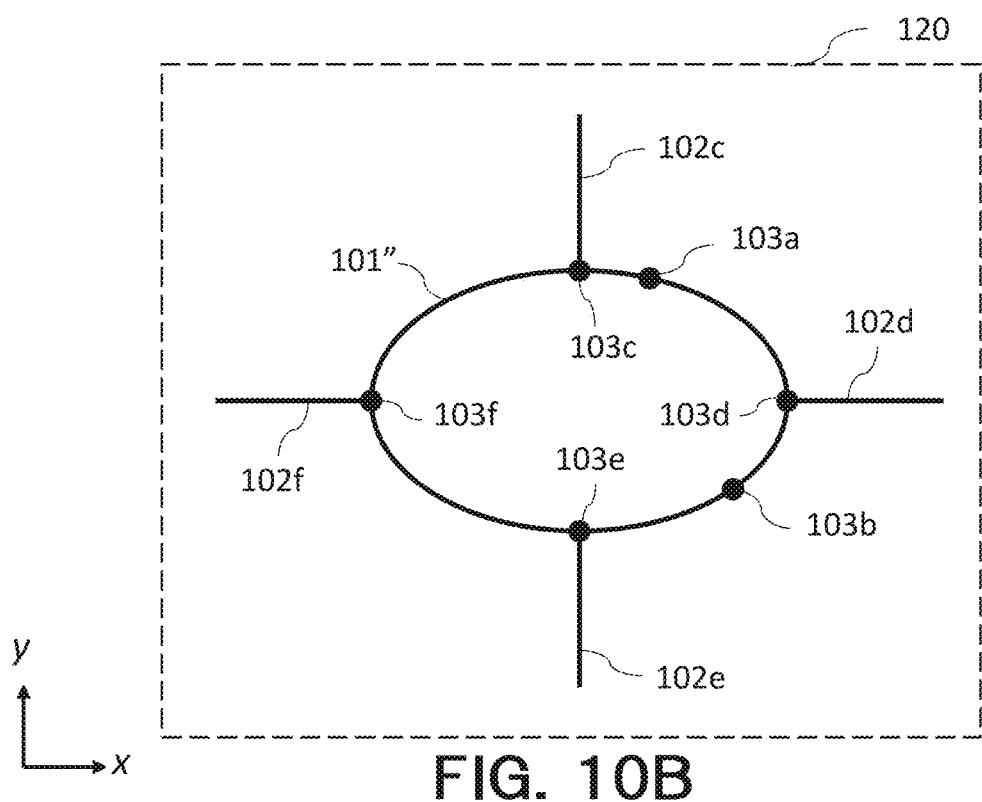

The transmission line 101 is in a circular shape in the present embodiment but may have any shape that allows a single stroke to make the round thereof. FIG. 10A and FIG. 10B illustrates power dividers different in the shape of the transmission line 101. FIG. 10A is an xy plan of a power divider 110 including a transmission line 101', which is quadrilateral, and FIG. 10B is an xy plan of a power divider 120 including a transmission line 101", which is elliptical.

Figure 11A:
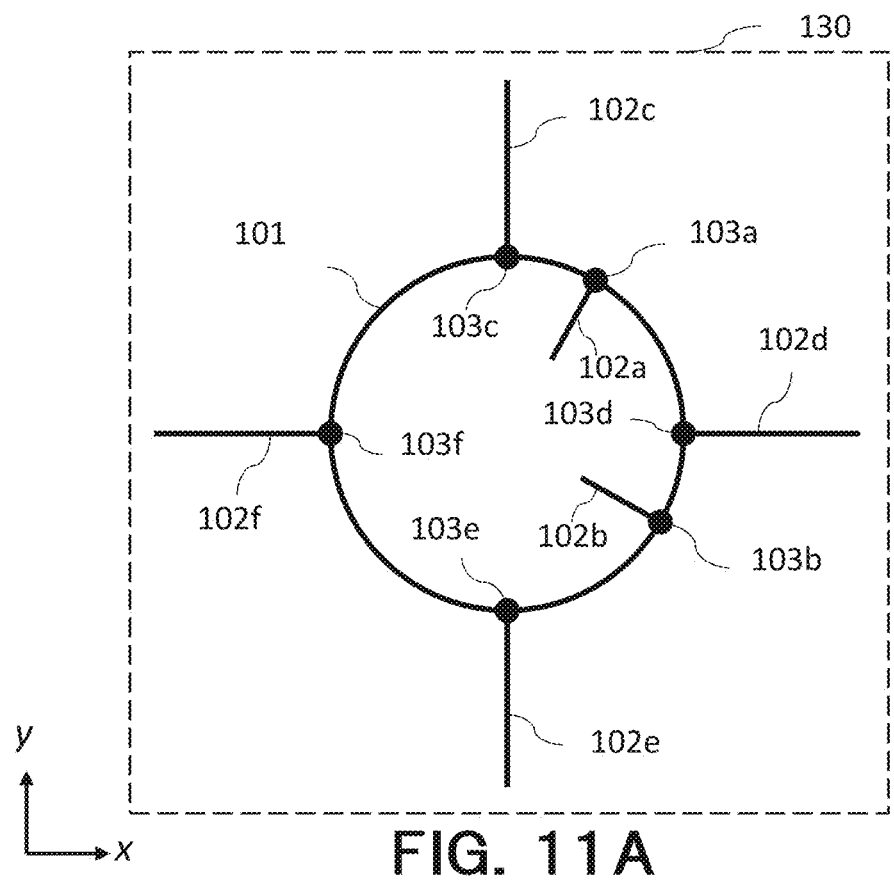
FIG. 11A and FIG. 11B are configuration diagrams of power dividers 130 and 130' applicable to the first embodiment.
Figure 11B:
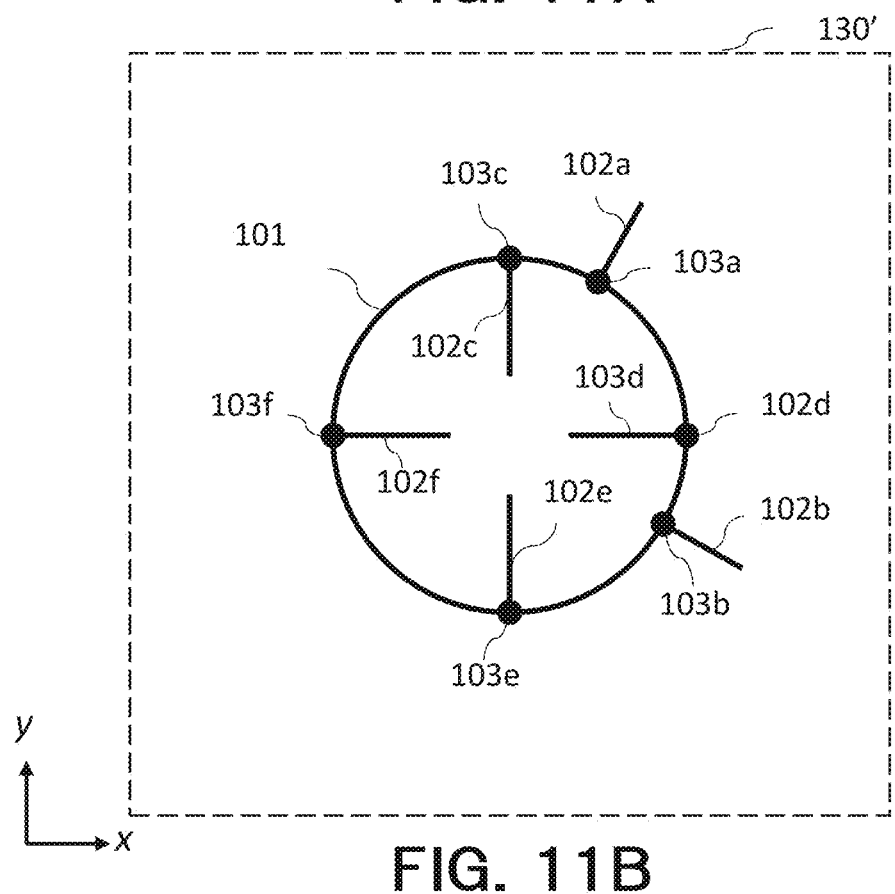

In the present embodiment, the transmission lines 102c to 102f are disposed to be flush with a plane of the transmission line 101, and the transmission lines 102a and 102b extend in a direction intersecting with the plane to be connected to the transmission line 101. The direction in which the transmission lines 102a to 102f extend is not limited to that in the present embodiment. At least some of the transmission lines 102a to 102f may be disposed to be flush with the plane of the transmission line 101 or may be disposed to be along with a direction or directions intersecting with the plane. For example, FIG. 11A and FIG. 11B illustrate modifications about directions in which the transmission lines 102a to 102f are connected. FIG. 11A is an xy plan of a power divider 130, which is a modification of the power divider 100. In the power divider 130, the transmission lines 102a and 102b are disposed to be flush with a plane of the transmission line 101 and connected to the transmission line 101 from inside the transmission line 101. FIG. 11B is an xy plan of a power divider 130', which is a modification of the power divider 100. In the power divider 130', the transmission lines 102a and 102b are disposed to be flush with a plane of the transmission line 101 and connected to the transmission line 101 from outside the transmission line 101. In the power divider 130', the transmission lines 102c to 102f are connected to the transmission line 101 from inside the transmission line 101.

Figure 12A:
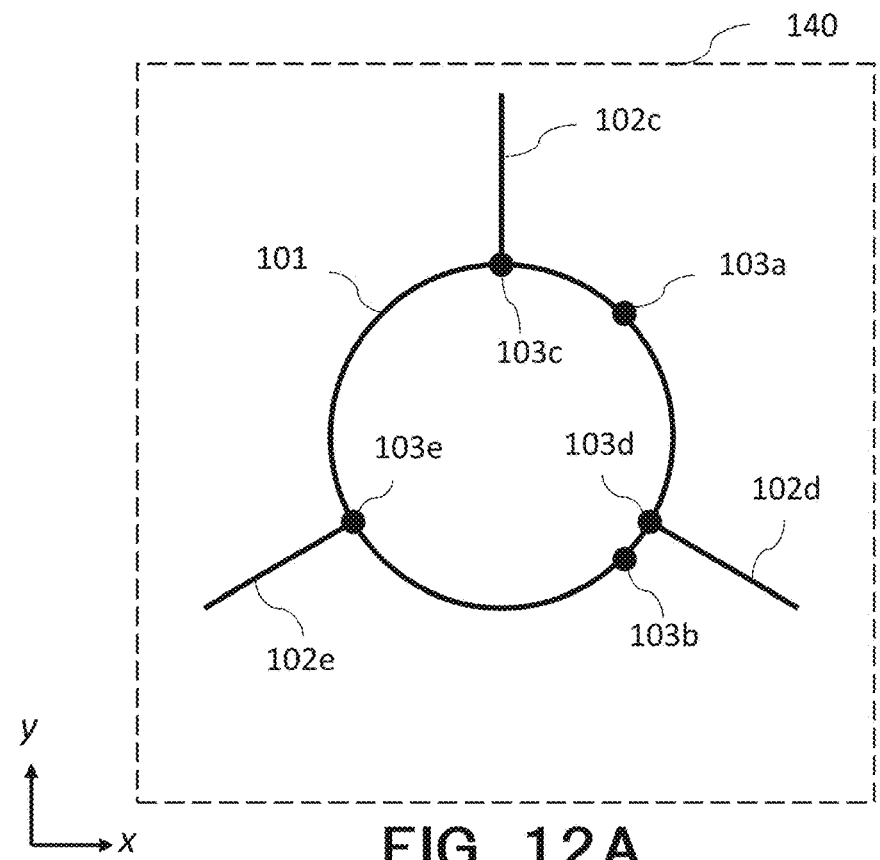
FIG. 12A and FIG. 12B are configuration diagrams of power dividers 140 and 150 applicable to the first embodiment.
Figure 12B:
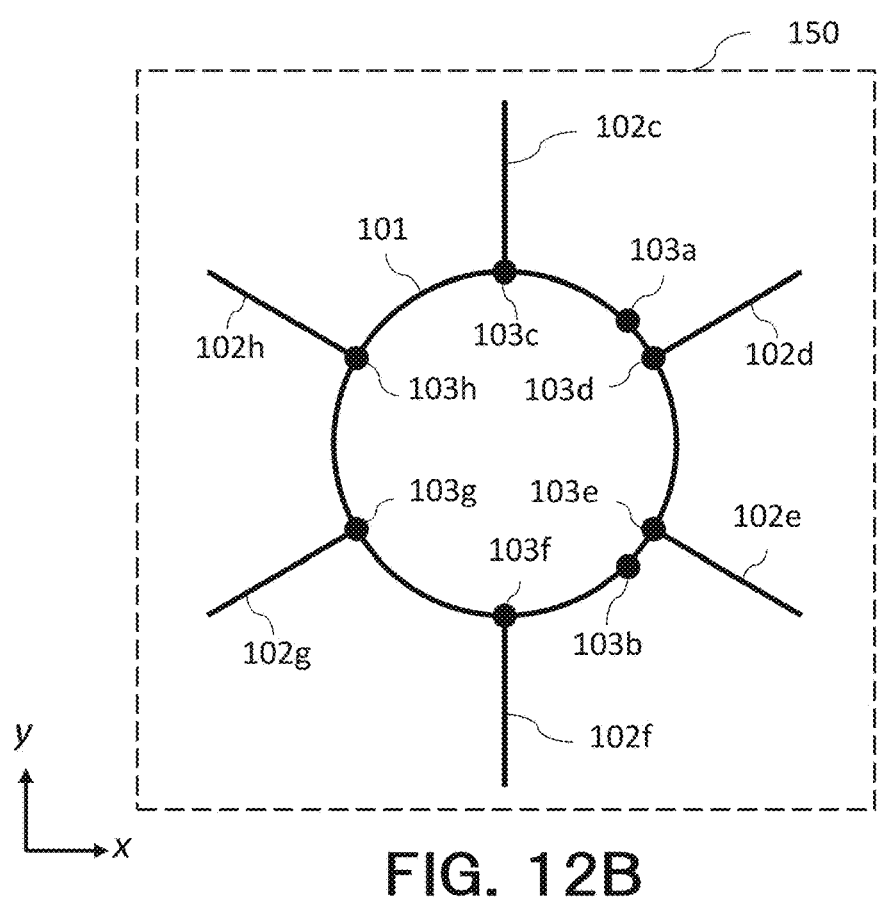

The present embodiment is described about a case where a number of the output transmission lines is four, but the number of the output transmission lines is not limited to four. The number of the output transmission lines may be any number more than one, for example, three or six. FIG. 12A and FIG. 12B illustrates power dividers different in the number of the output transmission lines. FIG. 12A is an xy plan of a power divider 140 including three output transmission lines, and FIG. 12B is an xy plan of a power divider 150 including six output transmission lines.
(Modification 3)

The present modification is a modification relating to placement of the power divider 100. The present modification will be described.

Figure 13:
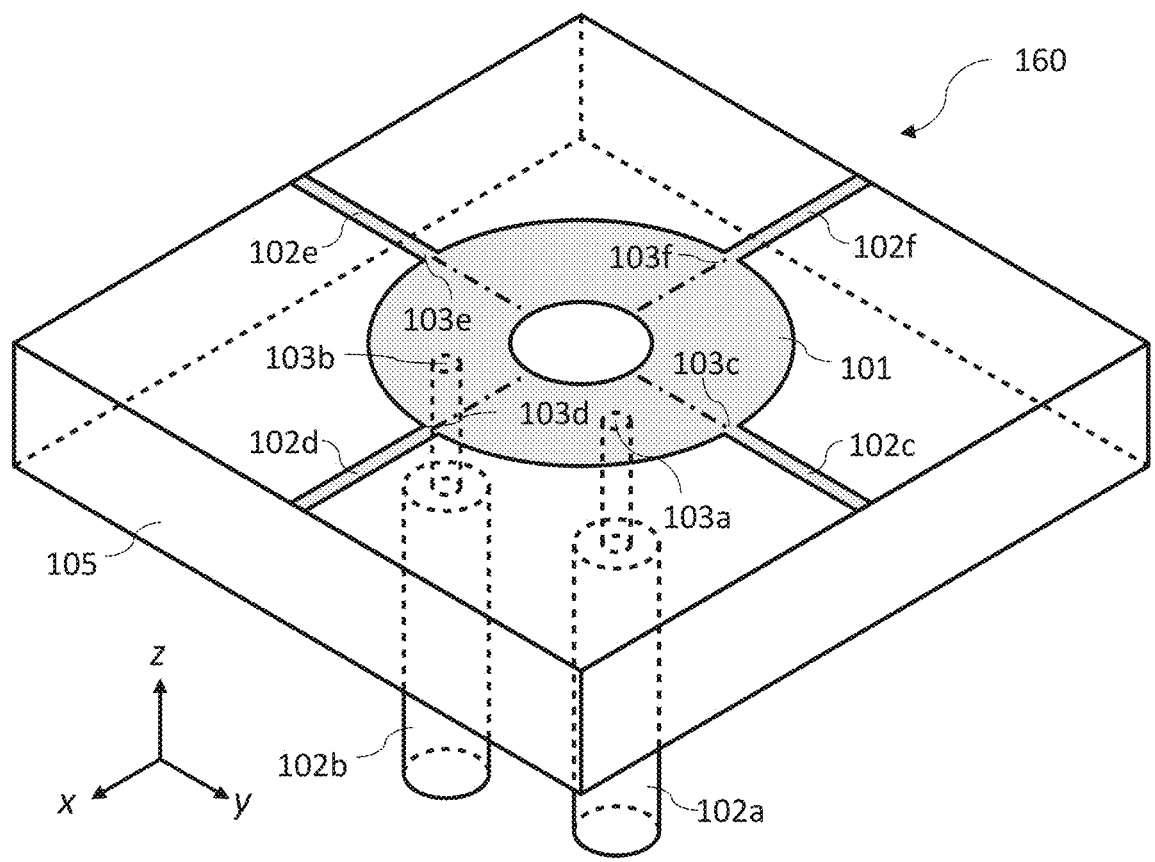
FIG. 13 is a configuration diagram of a power divider 160 applicable to the first embodiment.

FIG. 13 is a solid view of a power divider 160 formed in a dielectric substrate, which is a placement of the power divider 100. The transmission line 101 and the transmission lines 102c to 102f are located or formed on a dielectric substrate 105. The dielectric substrate is formed of insulator examples of which include a resin substrate made of polytetrafluoroethylene (PTFE), epoxy, or the like, foamed plastic made by foaming resin, and a film substrate made of liquid crystal polymer or the like.

The transmission line 101 is a microstrip line and illustrated in an annular shape as an example. In the power divider 160, the transmission line 101 and the transmission lines 102c to 102f are integrally formed, but the transmission line 101 is to be connected to the integrally formed transmission lines 102c to 102f via the corresponding connection portions 103c to 103f. In this case, the connection portions 103c to 103f may be regarded as portions of the transmission line 101 or may be regarded as portions of the corresponding transmission lines 102c to 102f. The connection portions 103c to 103f may be regarded as given portions of dash-dot lines that extend from a centroid of the transmission line 101 to the transmission lines 102c to 102f.

In the power divider 160, transmission line 102a and the transmission line 102b are illustrated as coaxial lines. The coaxial lines include inner conductors. As an example, FIG. 13 shows that the inner conductors are located or formed in the dielectric substrate 105 and connected to the transmission line 101. Examples of the inner conductor of each coaxial line include a conductor via formed in the dielectric substrate 105. The connection portions 103a and 103b are portions at which the inner conductors are connected to the transmission line 101.

Figure 14:
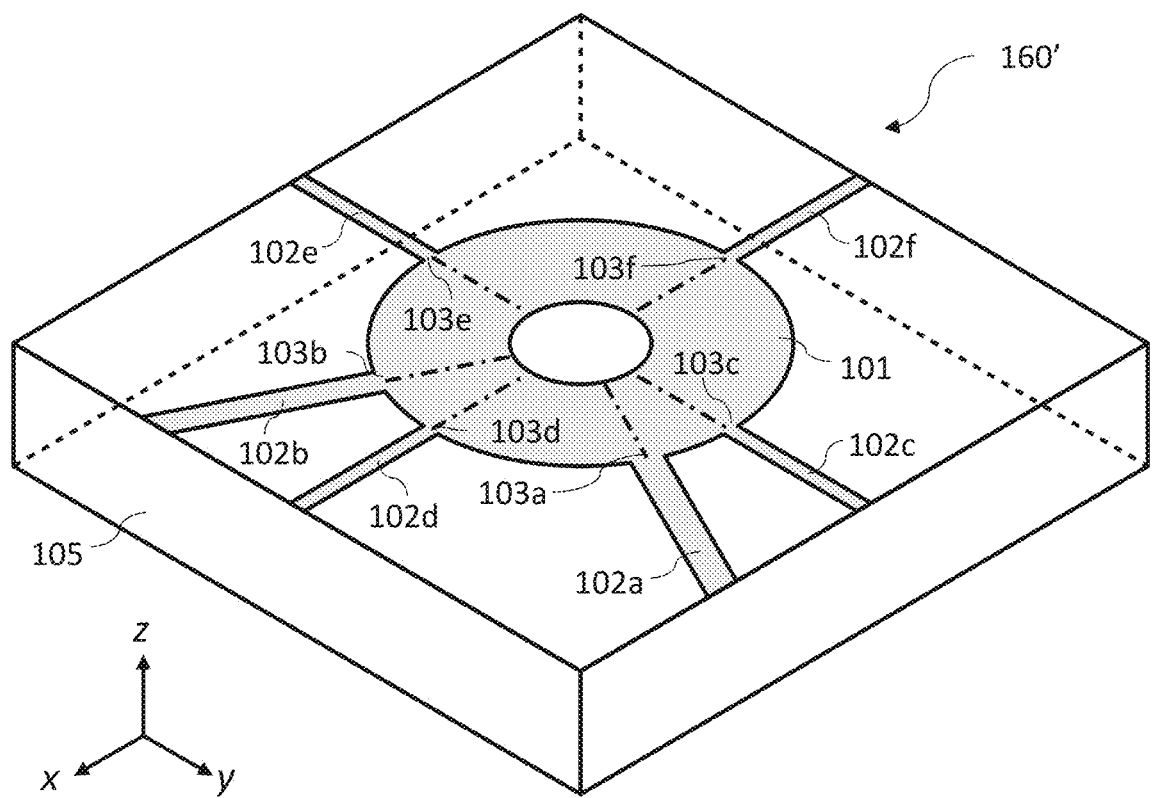
FIG. 14 is a configuration diagram of a power divider 160' applicable to the first embodiment.

The transmission lines 101 and 102a to 102f may be all located or formed on the dielectric substrate. FIG. 14 is a solid view of a power divider 160', in which the transmission lines 101 and 102a to 102f are all located or formed on the dielectric substrate 105. In the power divider 160', the transmission line 101 and 102c to 102f, as well as the transmission lines 102a and 102b are located or formed on the dielectric substrate 105. The transmission lines 101 and 102a to 102f are integrally formed, but the transmission line 101 is to be connected to the integrally formed transmission lines 102a to 102f via the corresponding connection portions 103a to 103f. In this case, the connection portions 103a to 103f may be regarded as portions of the transmission line 101 or may be regarded as portions of the corresponding transmission lines 102a to 102f. The connection portions 103a to 103f may be regarded as given portions of dash-dot lines that extend from a centroid of the transmission line 101 to the transmission lines 102a to 102f.

The formation on the dielectric substrate 105 is described above as a placement of the power divider 100. However, at least some of the transmission lines 101 and 102a to 102f may not be located or formed on or inside the dielectric substrate 105; at least some of the transmission lines 101 and 102a to 102f may be located or formed on one of a plurality of dielectric substrates 105 and the others of the transmission lines 101 and 102a to 102f may be located or formed on the other or others of the dielectric substrates. Forming a power divider on a dielectric substrate can improve mass productivity, reducing production costs.
(Modification 4)

Figure 15A:
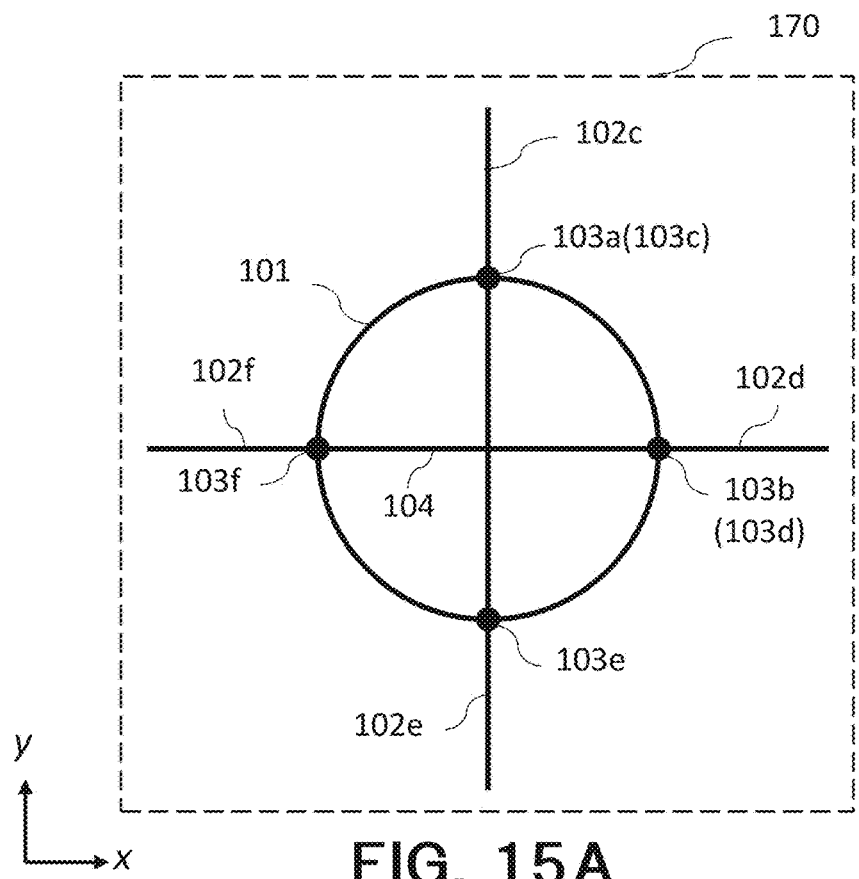
FIG. 15A and FIG. 15B are configuration diagrams of power dividers 170 and 170' applicable to the first embodiment.
Figure 15B:
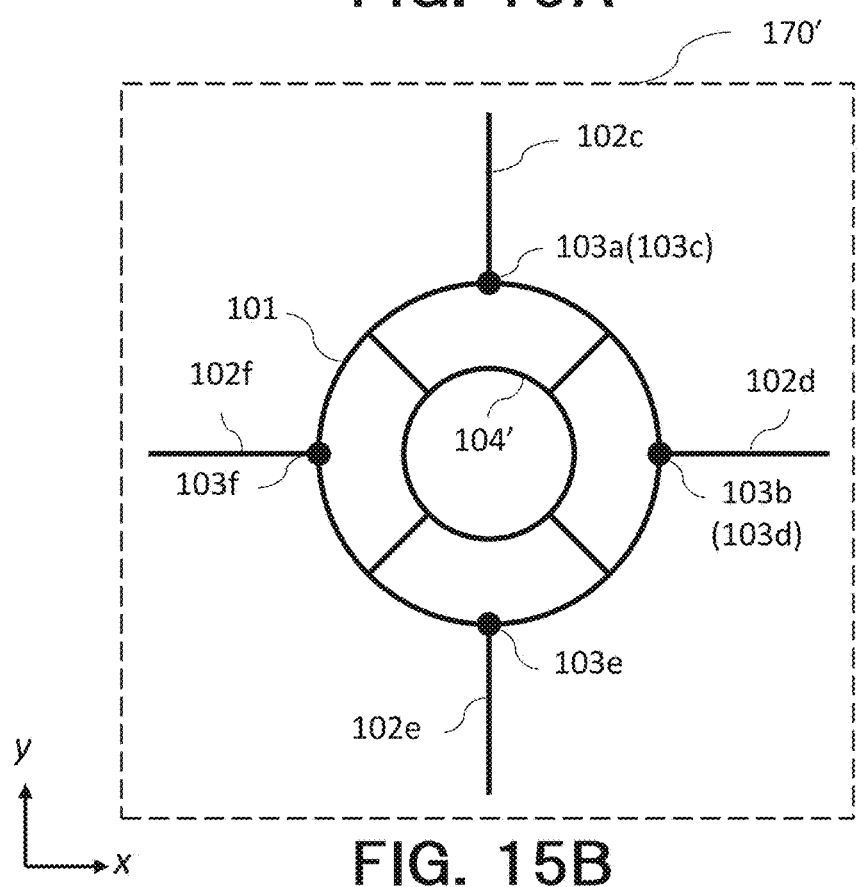

FIG. 15A and FIG. 15B are diagrams illustrating power dividers each including transmission lines 104 and 104' that are present within an inside of the transmission line 101 and connected to the transmission line 101 at a plurality of spots. As an example, power dividers 170 and 170' are each the power divider 100' described in the present embodiment that includes transmission lines 104 or 104' and applicable to the power dividers of the present embodiment and the modifications. FIG. 15A is an xy plan of the power divider 170 that includes the transmission lines 104 intersecting with each other within the inside of the transmission line 101. In the power divider 170, the transmission lines 104 are connected to the transmission line 101 at the connection portions 103a (103c), 103b (103d), 103e, and 103f.

FIG. 15B is an xy plan of the power divider 170' that includes the transmission line 104' inside the transmission line 101. The transmission line 104' is a combination of a transmission line and linear transmission lines connected to one another. As seen from the above, the transmission lines 104 and 104' may have any numbers, any shapes, and the like as long as the transmission lines 104 and 104' are present within the inside of the transmission line 101 and connected to the transmission line 101 at a plurality of spots. Note that the inside of the transmission line 101 is not limited to an inside of the transmission line 101 that is flush with the plane of the transmission line 101. For example, the transmission lines 104 and 104' may be formed in three dimensions. When viewed on a plane from a direction intersecting with the transmission line 101, the transmission lines 104 and 104' being present within the inside of the transmission line 101 suffice.

Providing the transmission lines 104 or 104' can restrain the output of the high frequency signals to unnecessary transmission lines (transmission lines designed not to allow the output of the high frequency signals). The restraint on the output of the high frequency signals to the unnecessary transmission lines can bring the scalar product "$[s_1][s_2]^H$" close to zero, thereby improving the usability of the polarized waves in combination.

Modifications of the present embodiment are described above. In the power dividers of the present embodiment, the connection portions 103a and 103b of the input transmission lines are disposed such that they are separated from each other along the transmission line 101 by approximately the quarter of the length of the transmission line 101, and the connection portions 103c to 103f of the output transmission lines are disposed such that they divide the length of the transmission line 101 evenly along the transmission line 101. This enables the power dividers of the present embodiment to output the components of the high frequency signal a input to the transmission line 102a and the components of the high frequency signal b input to the transmission line 102b such that the components of the high frequency signal a are orthogonal to the components of the high frequency signal b, and makes it possible to use the polarized waves in combination. Furthermore, the power dividers of the present embodiment can reduce the output of the high frequency signals to the input transmission lines or can output the high frequency signal a and the high frequency signal b to the output transmission lines different from each other by changing the locations of the connection portions 103a and 103b.

Second Embodiment

Figure 16A:
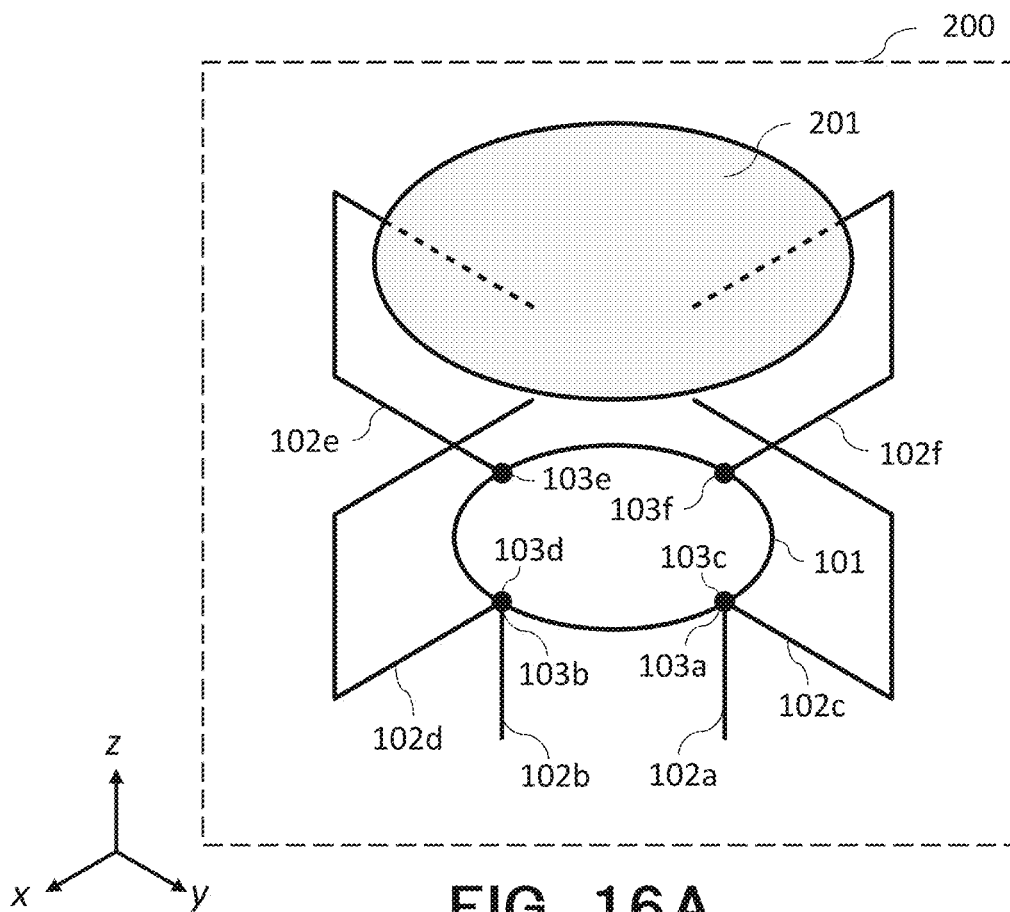
FIG. 16A and FIG. 16B are configuration diagrams of an antenna apparatus 200 in a second embodiment.
Figure 16B:
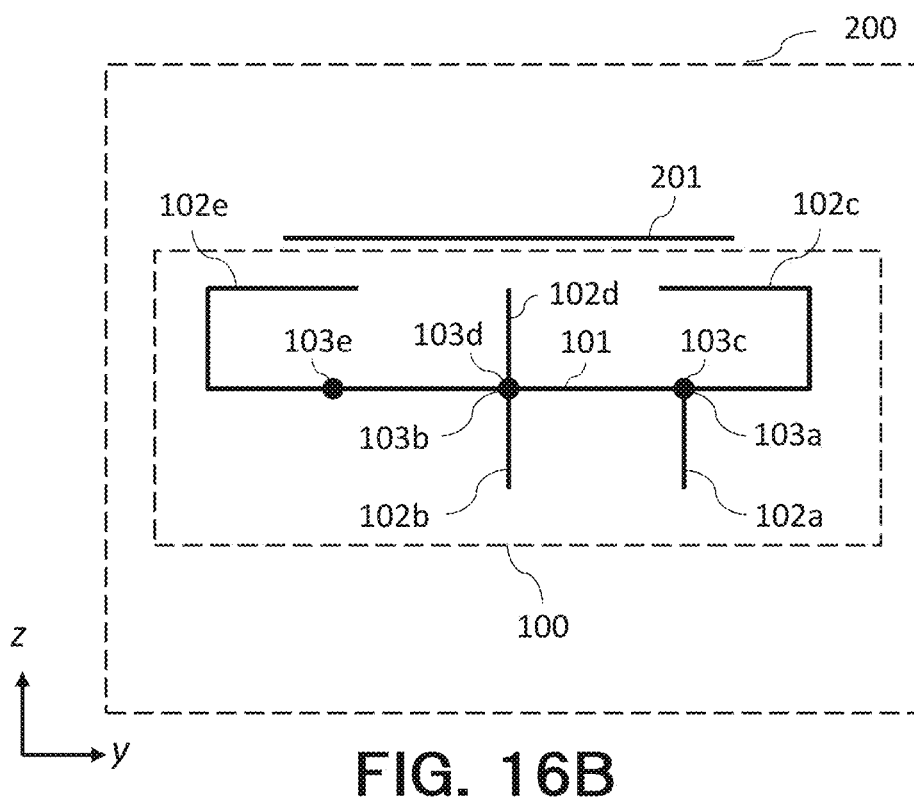

FIG. 16A and FIG. 16B are diagrams illustrating a configuration of an antenna apparatus 200 in a second embodiment. FIG. 16A is a solid view of the antenna apparatus 200, and FIG. 16B is a yz plan of the antenna apparatus 200. The antenna apparatus 200 includes the power divider described in the first embodiment as well as an antenna element 201. This forms the antenna apparatus 200 into an antenna apparatus that emits high frequency signals output to output transmission lines in a form of electromagnetic waves. As an example, the antenna apparatus 200 illustrated in FIG. 16A and FIG. 16B includes the power divider 100' (the phase difference θ=0°) provided with the antenna element 201.

The antenna element 201 emits electromagnetic waves in accordance with amplitudes and phases of the high frequency signals output to the output transmission lines. (Settings for the electromagnetic waves emitted by the antenna element 201 will be also referred to as a mode.) The antenna element 201 can emit electromagnetic waves in at least two modes. For example, the antenna element 201 emits two linearly polarized waves having orthogonal planes of polarization, two circularly polarized waves having different directions of rotation with respect to their propagation directions (hereinafter, also referred to as senses), and orbital angular momentum (OAM) modes of different mode numbers. The antenna element 201 can have any configuration capable of emitting the high frequency signals output to the output transmission lines. Examples of an antenna applicable to the antenna element 201 include a patch antenna, a dipole antenna, a loop antenna, a dielectric resonator antenna, a slot antenna, a waveguide, a reflector antenna, a lens antenna, an antenna with a metasurface, and the like. As an example of the present embodiment, FIG. 16A and FIG. 16B illustrate a circular patch antenna.

FIG. 16B illustrates the antenna apparatus 200 in which the output transmission lines are not in direct connection to the antenna element 201. However, high frequency signals are supplied from the output transmission lines to the antenna element 201 through electromagnetic coupling. The output transmission lines and the antenna element 201 may be configured such that at least some of the transmission lines are in direct connection to the antenna element 201.

The antenna apparatus 200 emitting electromagnetic waves in the two modes will be described. In the antenna apparatus 200, the antenna element 201 and transmission lines 102c to 102f are rotationally symmetric. In this case, the antenna apparatus 200 emits two electromagnetic waves being orthogonal polarized waves. As described in the first embodiment, the power divider 100' outputs the high frequency signal a input to a transmission line 102a to the transmission lines 102c and 102e in a form of high frequency signals that are equal in amplitude and opposite in phase. The high frequency signals equal in amplitude and opposite in phase output to the transmission lines 102c and 102e are emitted by the antenna element 201 in a form of an electromagnetic wave being a polarized wave that is parallel to a y axis direction. At the same time, the power divider 100' outputs the high frequency signal b input to a transmission line 102b to the transmission lines 102d and 102f in a form of high frequency signals equal in amplitude and opposite in phase. The high frequency signals equal in amplitude and opposite in phase output to the transmission lines 102d and 102f are emitted by the antenna element 201 in a form of an electromagnetic wave being a polarized wave that is parallel to an x axis direction. In the above manner, the antenna apparatus 200 emits the two electromagnetic waves being orthogonal polarized waves. The antenna element 201 is supplied with the signals with opposite phases from the transmission lines 102c and 102e (hereinafter, also referred to as differential power supply) and also provided with differential power supply from the transmission lines 102d and 102f. Therefore, cross-polarization discrimination (XPD) can be restrained from deteriorating over a wide frequency range.

The antenna apparatus 200 can also emit two electromagnetic waves being circularly polarized waves different in sense. In a case where the high frequency signals output to the transmission lines 102c to 102f are equal in amplitude, and the high frequency signals output to the transmission lines 102d to 102f are delayed in phase by 90° one by one with respect to the high frequency signal output to the transmission line 102c, the antenna element 201 emits a left-handed circularly polarized wave. This case is a case where, for example, with respect to a phase of the high frequency signal output to the transmission line 102c (0°), a phase of the high frequency signal output to the transmission line 102d is −90°, a phase of the high frequency signal output to the transmission line 102e is −180°, and a phase of the high frequency signal output to the transmission line 102f is −270°.

In contrast, in a case where the high frequency signals output to the transmission lines 102c to 102f are equal in amplitude, and the high frequency signals output to the transmission lines 102d to 102f are advanced in phase by 90° one by one with respect to the high frequency signal output to the transmission line 102c, the antenna element 201 emits a right-handed circularly polarized wave. This case is a case where, for example, with respect to the phase of the high frequency signal output to the transmission line 102c (0°), the phase of the high frequency signal output to the transmission line 102d is 90°, the phase of the high frequency signal output to the transmission line 102e is 180°, and the phase of the high frequency signal output to the transmission line 102f is 270°. An example of setting the phases of the high frequency signals for the transmission lines 102c to 102f will be described in a third embodiment. In the above manner, the antenna apparatus 200 emits the two electromagnetic waves being circularly polarized waves different in sense. When a left-handed circularly polarized wave and a right-handed circularly polarized wave equal in amplitude are emitted simultaneously, they are emitted in a form of a linearly polarized wave. Note that being emitted simultaneously is not limited to completely simultaneous emission but may include substantially simultaneous emission. Note that the linearly polarized wave is not limited to a completely linearly polarized wave but may include elliptically polarized waves.

The present embodiment is given about a case of θ=0° as an example of the description. However, as described in the first embodiment, the components of the high frequency signal a input to the transmission line 102a are orthogonal to the components of the high frequency signal b input to the transmission line 102b as long as the normalized characteristic impedance "$z_1$" of the transmission line 101 satisfies $z_1$=0. In addition, as described in the first embodiment, even in a case of $z_1$≠0, bringing "$z_1$" close to $z_1$=0 allows the components of the high frequency signal a and the high frequency signal b to be considered to be orthogonal to each other. That is, the antenna apparatus 200 can emit electromagnetic waves in at least two modes.

The antenna apparatus 200 in the present embodiment is described above. As with the first embodiment, modifications of the second embodiment can be implemented and carried out variously. For example, the modifications of the first embodiment are applicable to the antenna apparatus 200. Modifications of the second embodiment will be described below.

(Modifications)

Modifications of the configuration of the antenna apparatus 200 will be described below.

Figure 17A:
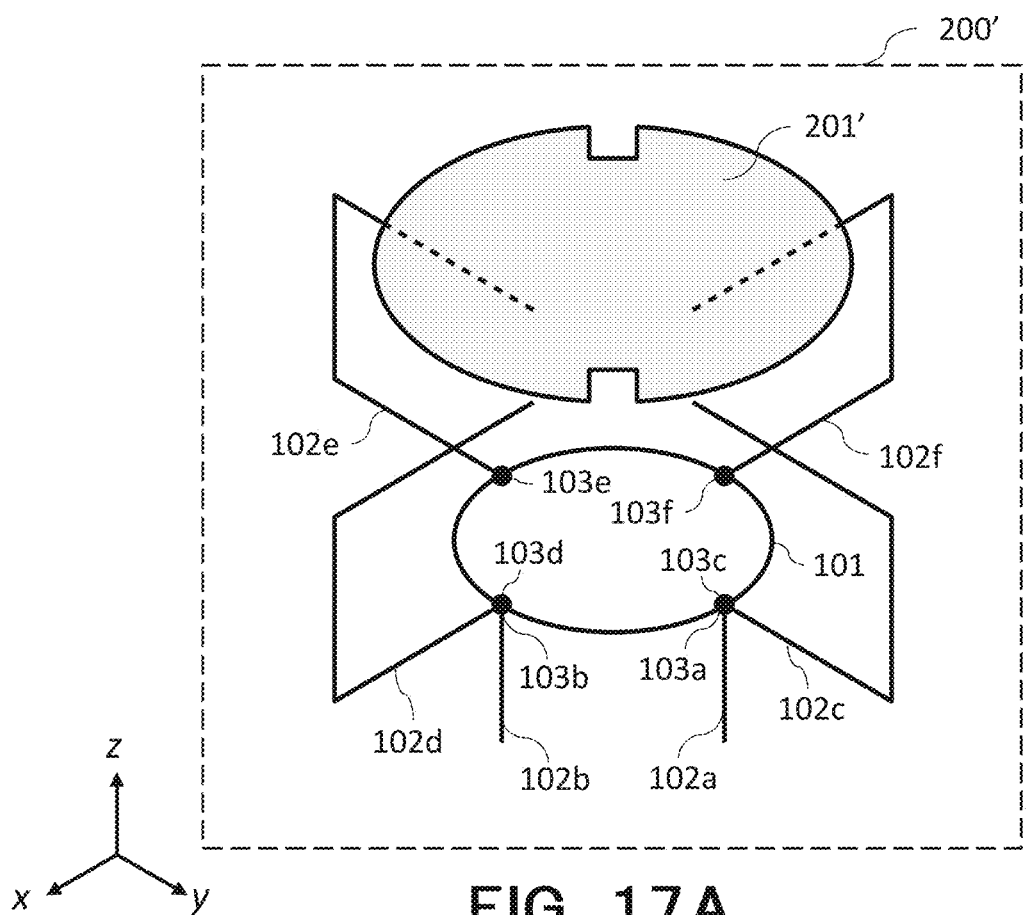
FIG. 17A and FIG. 17B are configuration diagrams of an antenna apparatus 200' applicable to the second embodiment.
Figure 17B:
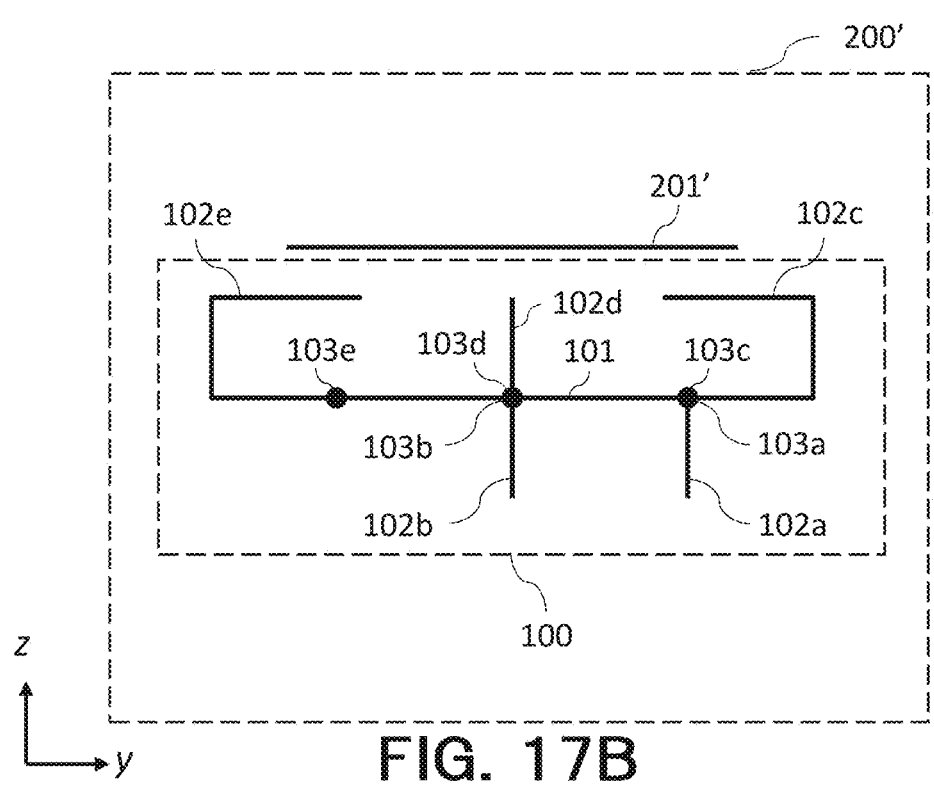

The antenna element 201 may be a patch antenna with notches. FIG. 17A and FIG. 17B are configuration diagrams of an antenna apparatus 200' including a patch antenna 201' with notches. FIG. 17A is a solid view of the antenna apparatus 200', and FIG. 17B is a yz plan of the antenna apparatus 200'. Except for the patch antenna 201', the antenna apparatus 200' is the same as the antenna apparatus 200 in the present embodiment. The antenna apparatus 200' can also emit electromagnetic waves in two modes.

The antenna element 201' can emit a high frequency signal in a form of a circularly polarized wave with its notches. In a case where the high frequency signal a is input to the transmission line 102a, and the high frequency signals equal in amplitude and opposite in phase are output to the transmission lines 102c and 102e, the antenna element 201' emits a right-handed circularly polarized wave. In contrast, in a case where the high frequency signal b is input to the transmission line 102b, and the high frequency signals equal in amplitude and opposite in phase are output to the transmission lines 102d and 102f, the antenna element 201' emits a left-handed circularly polarized wave. In the above manner, the antenna apparatus 200' can emit the two electromagnetic waves being orthogonal polarized waves. In this case, the antenna apparatus 200' emits the two electromagnetic waves being polarized waves that are different in sense and orthogonal to each other.

The antenna apparatus 200' can also emit two different linearly polarized waves. In a case where the high frequency signals output to the transmission lines 102c to 102f are equal in amplitude, and the high frequency signals output to the transmission lines 102d to 102f are delayed in phase by 90° one by one with respect to the high frequency signal output to the transmission line 102c, the antenna element 201 emits a linearly polarized wave A. This case is a case where, for example, with respect to a phase of the high frequency signal output to the transmission line 102c (0°), a phase of the high frequency signal output to the transmission line 102d is −90°, a phase of the high frequency signal output to the transmission line 102e is −180°, and a phase of the high frequency signal output to the transmission line 102f is −270°. In this case, when viewed from a positive z axis direction, the linearly polarized wave A has a plane of polarization inclining clockwise from the x axis by 45°.

In contrast, in a case where the high frequency signals output to the transmission lines 102c to 102f are equal in amplitude, and the high frequency signals output to the transmission lines 102d to 102f are advanced in phase by 90° one by one with respect to the high frequency signal output to the transmission line 102c, the antenna element 201 emits a linearly polarized wave B. This case is a case where, for example, with respect to the phase of the high frequency signal output to the transmission line 102c (0°), the phase of the high frequency signal output to the transmission line 102d is 90°, the phase of the high frequency signal output to the transmission line 102e is 180°, and the phase of the high frequency signal output to the transmission line 102f is 270°. In this case, when viewed from the positive z axis direction, the linearly polarized wave B has a plane of polarization inclining anticlockwise from the x axis by 45°. As described above, the antenna apparatus 200' can emit the two different linearly polarized waves. Note that the plane of polarization of the linearly polarized wave A is orthogonal to that of the linearly polarized wave B.

The above description is given about that a patch antenna that includes an antenna element with notches is applicable to the antenna apparatus 200 in the present embodiment.

Figure 18A:
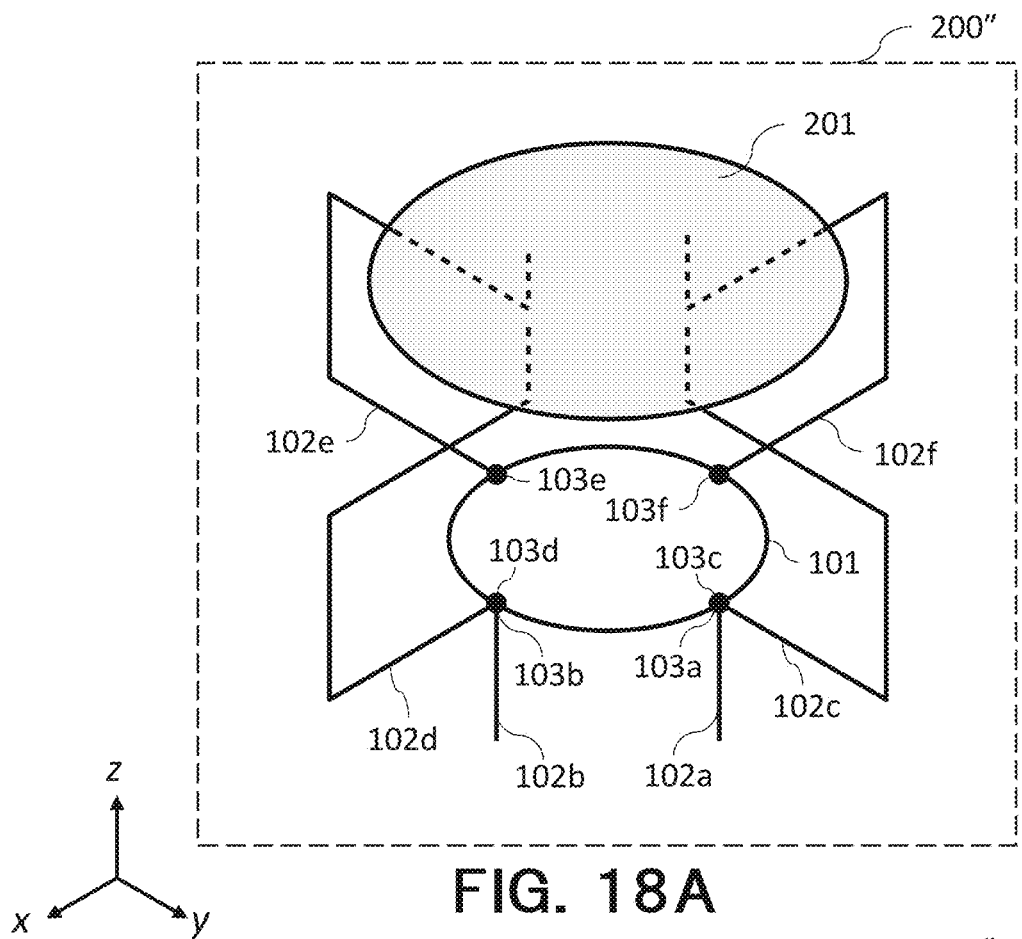
FIG. 18A and FIG. 18B are configuration diagrams of an antenna apparatus 200" applicable to the second embodiment.
Figure 18B:
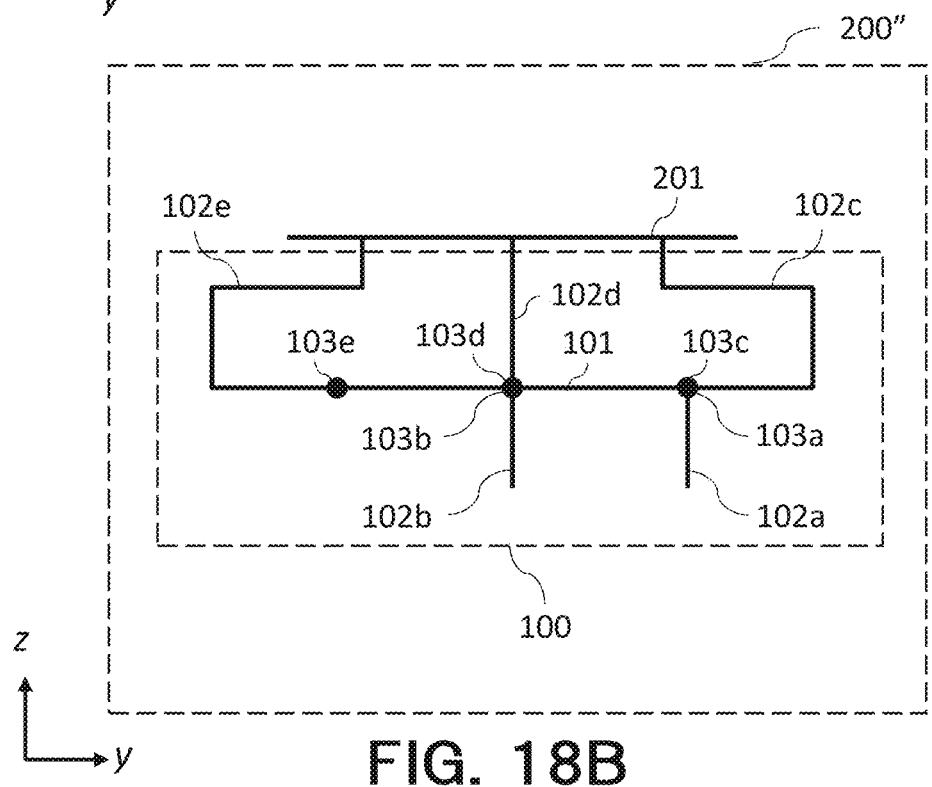

The antenna apparatus 200 in the present embodiment may be such that the output transmission lines are in direct connection to the antenna element. FIG. 18A and FIG. 18B are configuration diagrams of an antenna apparatus 200" in which the transmission lines 102c to 102f are in direct connection to the antenna element 201. FIG. 18A is a solid view of the antenna apparatus 200", and FIG. 18B is a yz plan of the antenna apparatus 200". The antenna element 201 may be supplied with high frequency signals directly from the output transmission lines or may be supplied with the high frequency signals through the electromagnetic coupling described in the present embodiment. The description relating to the emission of the high frequency signals by the antenna apparatus 200" is the same as in the present embodiment.

Figure 19A:
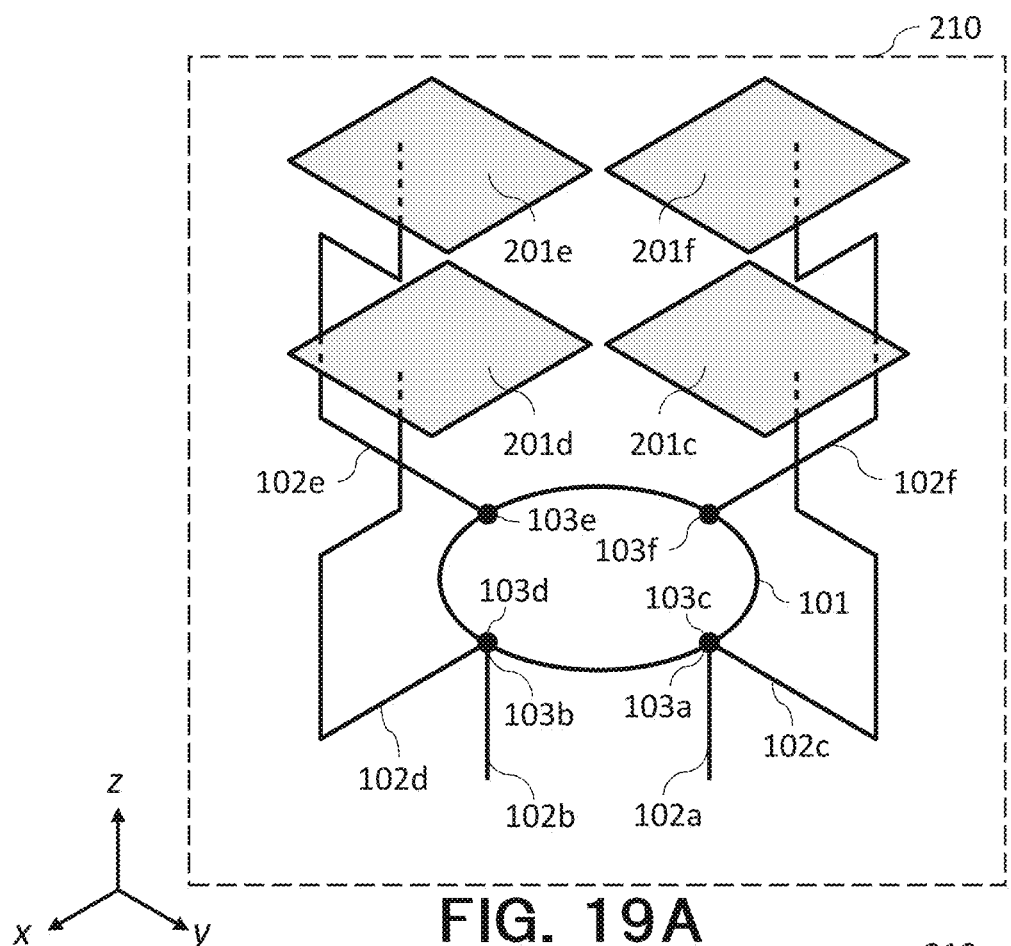
FIG. 19A and FIG. 19B are configuration diagrams of an antenna apparatus 210 applicable to the second embodiment.
Figure 19B:
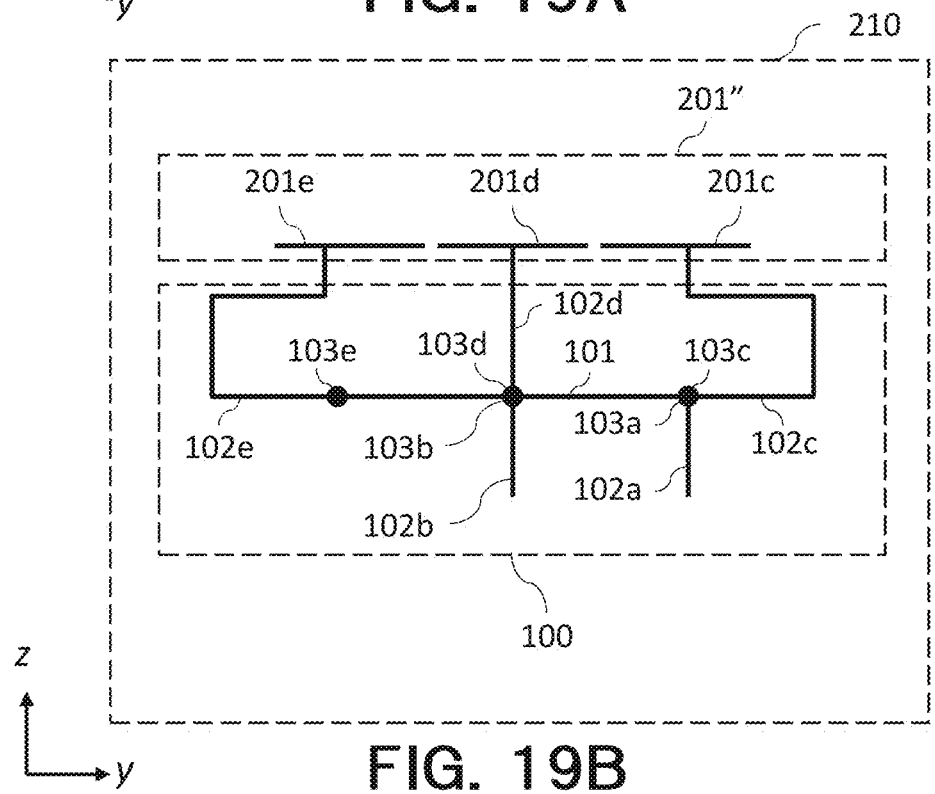

The antenna apparatus 200 in the present embodiment may include a plurality of antenna elements. FIG. 19A and FIG. 19B are configuration diagrams of an antenna apparatus 210 including a plurality of antenna elements. FIG. 19A is a solid view of the antenna apparatus 210, and FIG. 19B is a yz plan of the antenna apparatus 210. The antenna apparatus 210 includes an antenna element unit 201" that includes the plurality of antenna elements. The antenna element unit 201" includes an antenna element 201c connected to the transmission line 102c, an antenna element 201d connected to the transmission line 102d, an antenna element 201e connected to the transmission line 102e, and an antenna element 201f connected to the transmission line 102f. The antenna element 201c emits an electromagnetic wave from the high frequency signal output to the transmission line 102c, the antenna element 201d emits an electromagnetic wave from the high frequency signal output to the transmission line 102d, the antenna element 201e emits an electromagnetic wave from the high frequency signal output to the transmission line 102e, and the antenna element 201f emits an electromagnetic wave from the high frequency signal output to the transmission line 102f. In this case also, the antenna element unit 201" can emit electromagnetic waves in two modes as in the present embodiment.

Modifications of the antenna apparatus 200 are described above. By including the power divider described in the first embodiment as well as antenna elements, the antenna apparatus in the present embodiment can be formed into an antenna apparatus that emits high frequency signals output to output transmission lines in a form of electromagnetic waves. The power divider described in the first embodiment enables the emission of electromagnetic waves in at least two modes.

Third Embodiment

Figure 20A:
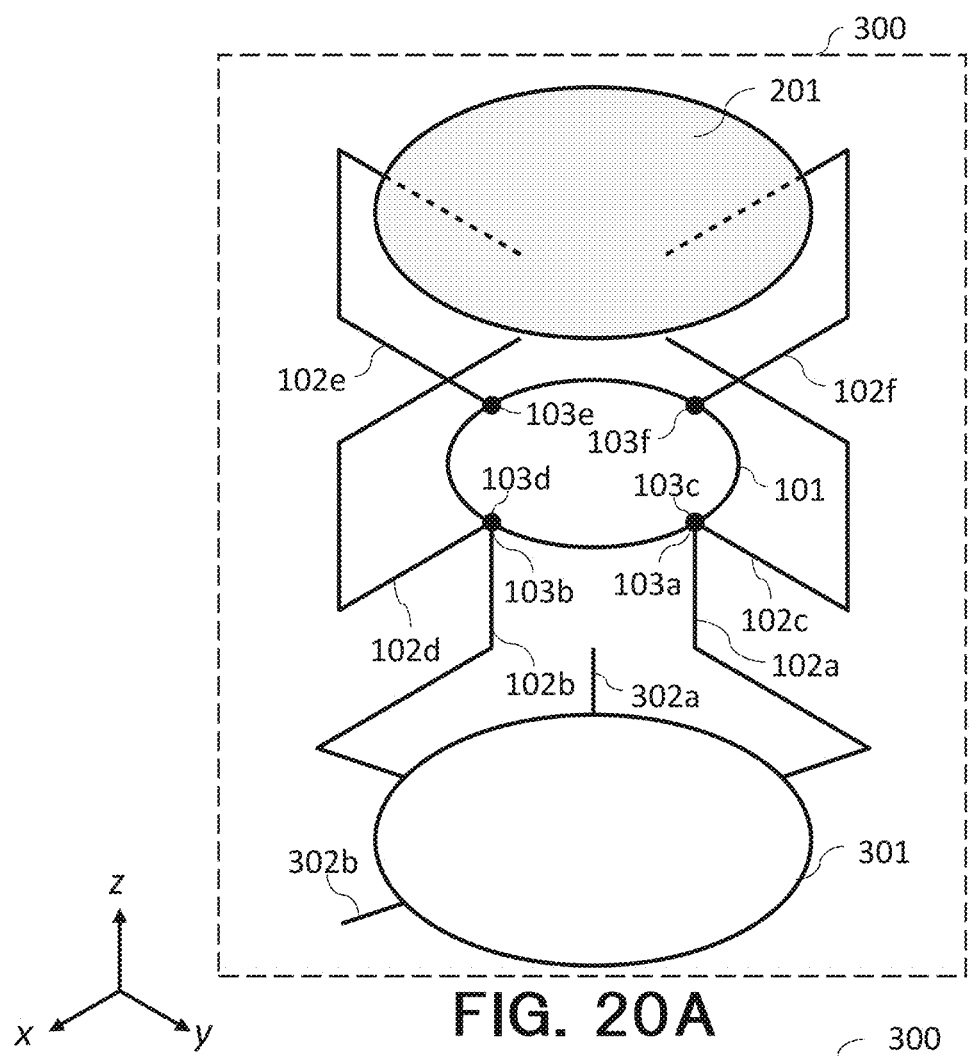
FIG. 20A and FIG. 20B are configuration diagrams of an antenna apparatus 300 in a third embodiment.
Figure 20B:
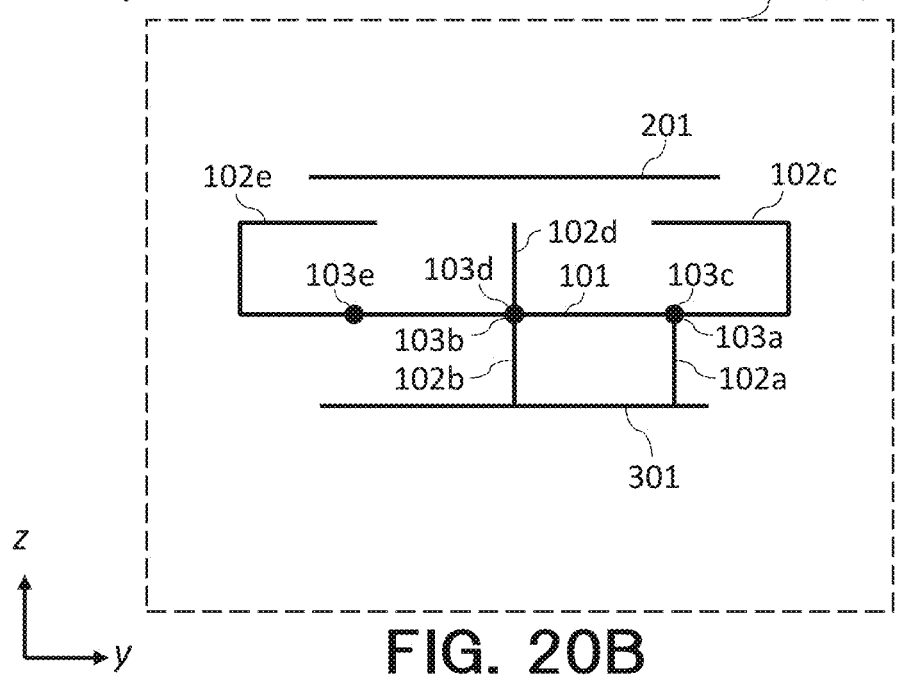

FIG. 20A and FIG. 20B are diagrams illustrating a configuration of an antenna apparatus 300 in a third embodiment. FIG. 20A is a solid view of the antenna apparatus 300, and FIG. 20B is a yz plan of the antenna apparatus 300. The antenna apparatus 300 includes the antenna apparatus described in the second embodiment as well as a hybrid coupler 301. This enables a phase difference between high frequency signals input to input transmission lines to take a given value in accordance with input sources of high frequency signals input to the hybrid coupler 301. This causes a phase difference between high frequency signals output to output transmission lines to take a given value, forming the electromagnetic wave emitted from the antenna apparatus 300 into an electromagnetic wave in a given mode. As an example, the antenna apparatus 300 illustrated in FIG. 20A and FIG. 20B includes the antenna apparatus 200 provided with the hybrid coupler 301. The antenna apparatus 300 can also emit electromagnetic waves in at least two modes.

The hybrid coupler 301 divides the input high frequency signal to the input transmission lines as signals having a phase difference in accordance with the input sources of the high frequency signals. The antenna apparatus 300 can emit electromagnetic waves in two modes using the hybrid coupler 301. As an example of the present embodiment, a case where the hybrid coupler 301 is a 180° hybrid coupler will be described.

The high frequency signals are input from transmission lines 302a and 302b to the hybrid coupler 301 and output to transmission lines 102a and 102b. The hybrid coupler 301 may be any 180° hybrid coupler. For example, the hybrid coupler 301 may be a rat-race 180° hybrid coupler. Alternatively, a magic Tee, a directional coupler, or the like may be used to form the 180° hybrid coupler. FIG. 20A and FIG. 20B illustrate a rat-race 180° hybrid coupler as an example. How the antenna apparatus 300 operates will be described below.

Upon receiving the high frequency signal from the transmission line 302a, the hybrid coupler 301 outputs high frequency signals equal in amplitude and phase to the transmission lines 102a and 102b. That is, a high frequency signal a input to the transmission line 102a and a high frequency signal b input to the transmission line 102b are equal in amplitude and phase. The high frequency signal a is output to a transmission line 102c and a transmission line 102e in a form of high frequency signals equal in amplitude and opposite in phase. The high frequency signal b is output to a transmission line 102d and a transmission line 102f in a form of high frequency signals equal in amplitude and opposite in phase. That is, the high frequency signals output to the transmission lines 102c to 102f are equal in amplitude. The high frequency signals output to the transmission lines 102c and 102d are equal in phase, and the high frequency signals output to the transmission lines 102e and 102f are equal in phase. On the other hand, the high frequency signal output to the transmission line 102c (102d) and the high frequency signal output to the transmission line 102e (102f) are opposite in phase. From the high frequency signals supplied from the transmission lines 102c to 102f, the antenna element 201 emits a linearly polarized wave of which a plane of polarization inclines from the x axis in the y axis direction by −45° when viewed in the positive z axis direction.

Upon receiving the high frequency signal from the transmission line 302b, the hybrid coupler 301 outputs high frequency signals equal in amplitude and opposite in phase to the transmission lines 102a and 102b. That is, the high frequency signal a input to the transmission line 102a and the high frequency signal b input to the transmission line 102b are equal in amplitude and opposite in phase. The high frequency signal a is output to a transmission line 102c and a transmission line 102e in a form of high frequency signals equal in amplitude and opposite in phase. The high frequency signal b is output to a transmission line 102d and a transmission line 102f in a form of high frequency signals equal in amplitude and opposite in phase. That is, the high frequency signals output to the transmission lines 102c to 102f are equal in amplitude. The high frequency signals output to the transmission lines 102c and 102f are equal in phase, and the high frequency signals output to the transmission lines 102d and 102e are equal in phase. On the other hand, the high frequency signal output to the transmission line 102c (102f) and the high frequency signal output to the transmission line 102d (102e) are opposite in phase. From the high frequency signals supplied from the transmission lines 102c to 102f, the antenna element 201 emits a linearly polarized wave of which a plane of polarization inclines from the x axis in the y axis direction by 45° when viewed in the positive z axis direction.

As seen from the above, the antenna apparatus 300 emits linearly polarized waves orthogonal to each other in accordance with the transmission lines 302a and 302b being input sources of the high frequency signals. The planes of polarization of the linearly polarized waves emitted from the antenna element 201 each incline from the x axis by 45° when viewed in the positive z axis direction. Providing the hybrid coupler 301 can cause the planes of polarization of the linearly polarized waves to incline by 45° without rotating the antenna apparatus mechanically.

The antenna apparatus 300 in the present embodiment is described above. As with the first and second embodiments, modifications of the third embodiment can be implemented and carried out variously. For example, the modifications of the first and second embodiments are applicable to the antenna apparatus 300. Modifications of the third embodiment will be described below.

(Modification 1)

Figure 21A:
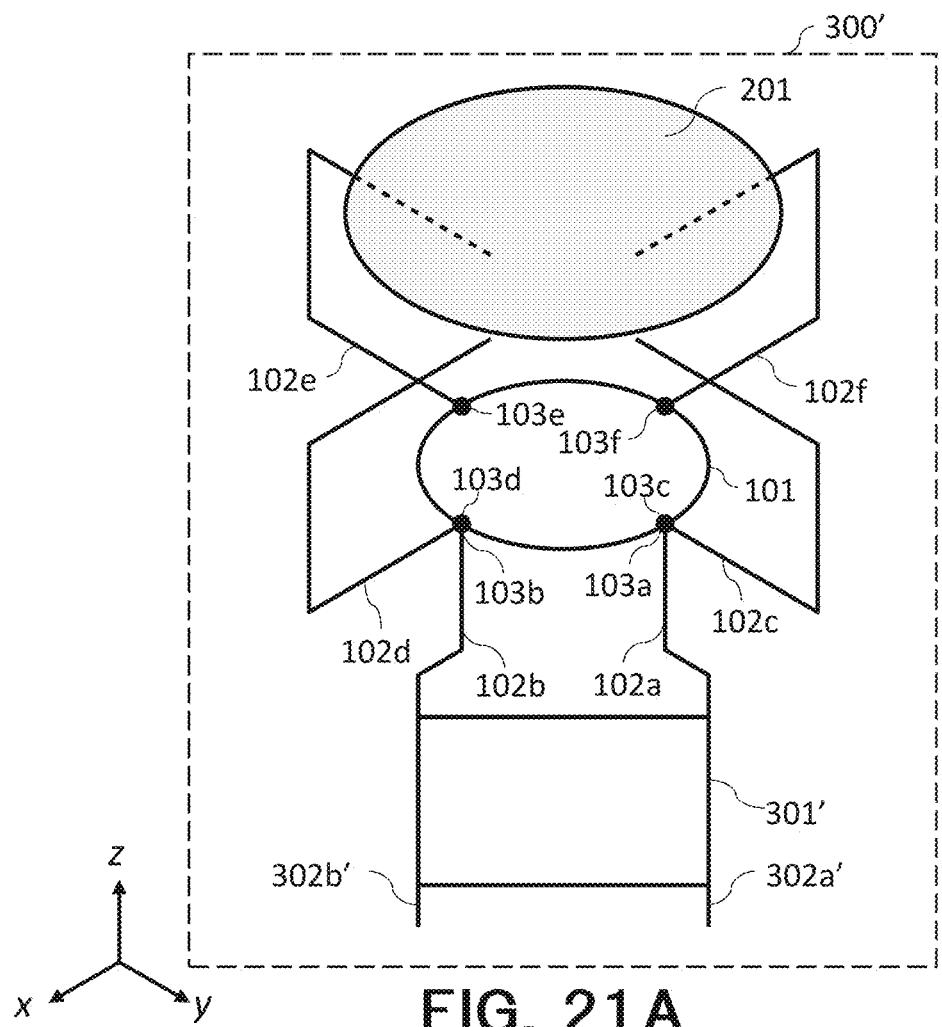
FIG. 21A and FIG. 21B are configuration diagrams of an antenna apparatus 300' in the third embodiment.
Figure 21B:
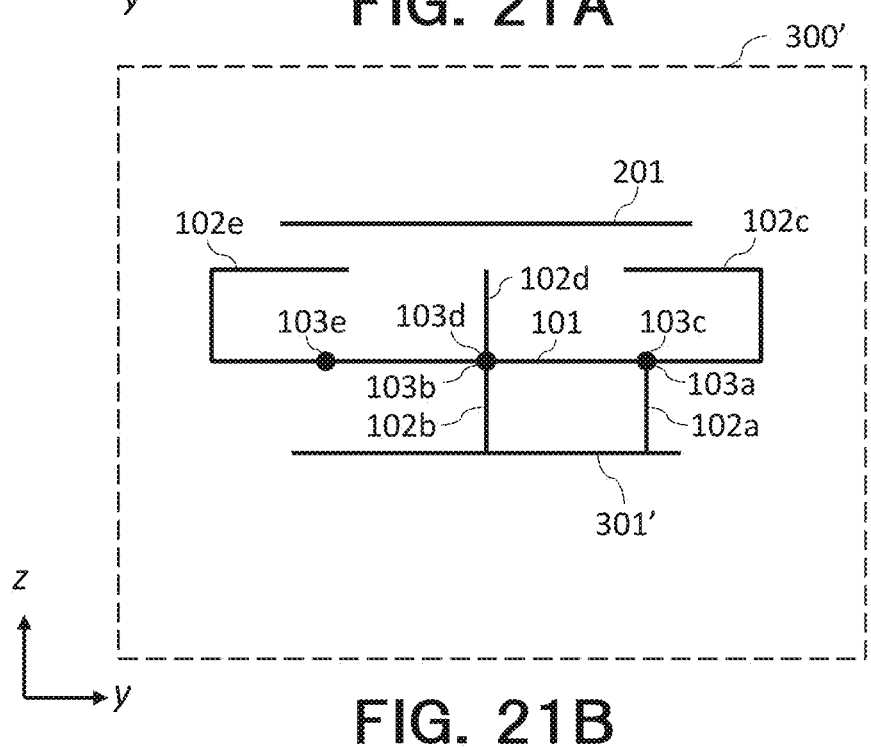

The present embodiment is described about a case of a 180° hybrid coupler, but a 90° hybrid coupler may be used. In a case of a 90° hybrid coupler, the electromagnetic waves being polarized waves emitted by the antenna element 201 differ. FIG. 21A and FIG. 21B are diagrams illustrating an antenna apparatus 300' including a hybrid coupler 301'. FIG. 21A is a solid view of the antenna apparatus 300', and FIG. 21B is a yz plan of the antenna apparatus 300'. The antenna apparatus 300' can emit electromagnetic waves in two modes using the hybrid coupler 301'. Using the hybrid coupler 301' enables the high frequency signals supplied from the transmission lines 102c to 102f to the antenna element 201 to have a phase difference of 90° between one another.

The hybrid coupler 301' is a 90° hybrid coupler. The high frequency signals are input from transmission lines 302a' and 302b' to the hybrid coupler 301' and output to transmission lines 102a and 102b. How the antenna apparatus 300' operates will be described below.

Upon receiving the high frequency signal from the transmission line 302a', the hybrid coupler 301' outputs high frequency signals equal in amplitude to the transmission lines 102a and 102b. The high frequency signal b input to the transmission line 102b is delayed in phase by 90° from the high frequency signal a input to the transmission line 102a. The high frequency signal a is output to a transmission line 102c and a transmission line 102e in a form of high frequency signals equal in amplitude and opposite in phase. The high frequency signal b is output to a transmission line 102d and a transmission line 102f in a form of high frequency signals equal in amplitude and opposite in phase. That is, the high frequency signals output to the transmission lines 102c to 102f are equal in amplitude, and the high frequency signals output to the transmission lines 102c to 102f are delayed in phase by 90° one by one with respect to the high frequency signal output to the transmission line 102c. For example, with respect to a phase of the high frequency signal output to the transmission line 102c (0°), a phase of the high frequency signal output to the transmission line 102d is −90°, a phase of the high frequency signal output to the transmission line 102e is −180°, and a phase of the high frequency signal output to the transmission line 102f is −270°. In this case, as described in the second embodiment, the antenna element 201 supplied with the high frequency signals from the transmission lines 102c to 102f emits a left-handed circularly polarized wave.

In contrast, upon receiving the high frequency signal from the transmission line 302b', the hybrid coupler 301' outputs high frequency signals equal in amplitude to the transmission lines 102a and 102b. The high frequency signal b input to the transmission line 102b is advanced in phase by 90° from the high frequency signal a input to the transmission line 102a. The high frequency signal a is output to a transmission line 102c and a transmission line 102e in a form of high frequency signals equal in amplitude and opposite in phase. The high frequency signal b is output to a transmission line 102d and a transmission line 102f in a form of high frequency signals equal in amplitude and opposite in phase. That is, the high frequency signals output to the transmission lines 102c to 102f are equal in amplitude, and the high frequency signals output to the transmission lines 102c to 102f are advanced in phase by 90° one by one with respect to the high frequency signal output to the transmission line 102c. For example, with respect to a phase of the high frequency signal output to the transmission line 102c (0°), a phase of the high frequency signal output to the transmission line 102d is 90°, a phase of the high frequency signal output to the transmission line 102e is 180°, and a phase of the high frequency signal output to the transmission line 102f is 270°. In this case, as described in the second embodiment, the antenna element 201 supplied with the high frequency signals from the transmission lines 102c to 102f emits a right-handed circularly polarized wave.

As seen from the above, the antenna apparatus 300' emits circularly polarized waves orthogonal to each other and different in sense, in accordance with the input of the high frequency signals from the transmission lines 302a' and 302b'.

(Modification 2)

Figure 22A:
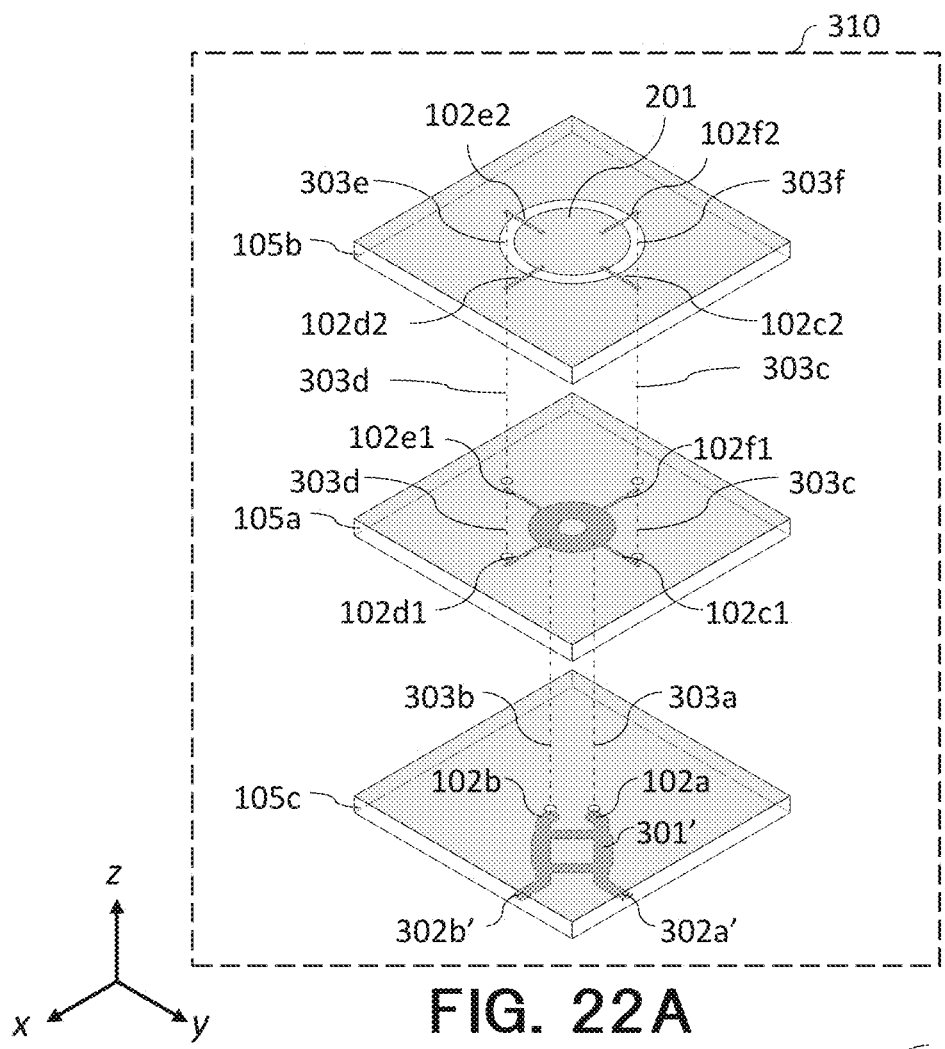
FIG. 22A and FIG. 22B are configuration diagrams of an antenna apparatus 210 applicable to the third embodiment.
Figure 22B:
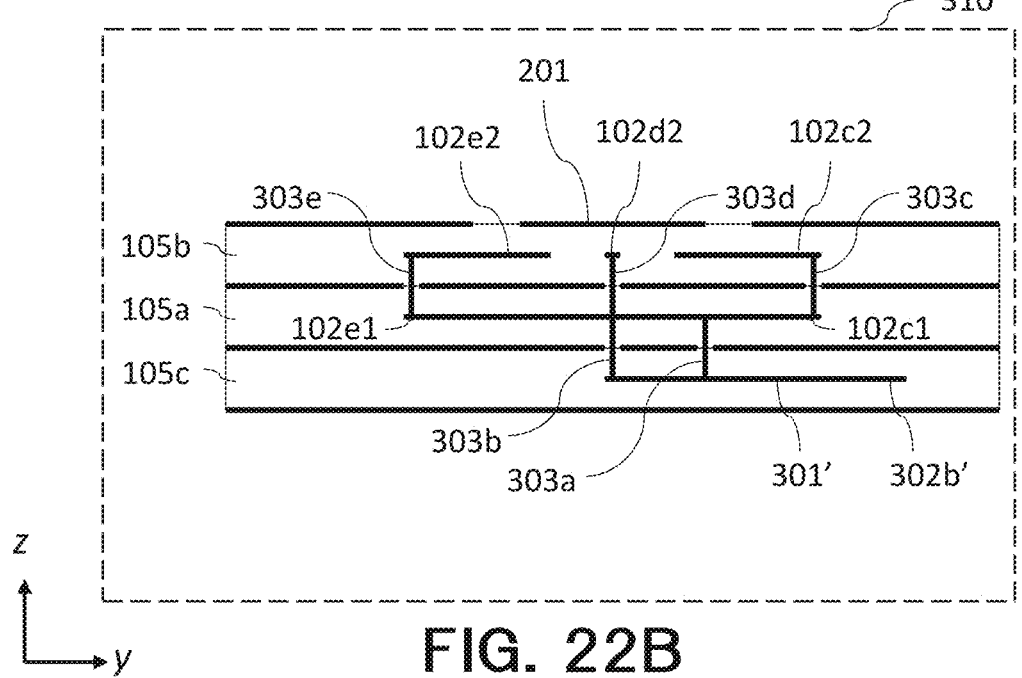

The present modification is a modification relating to placement of the antenna apparatus. The present modification will be described. FIG. 22A and FIG. 22B are diagrams illustrating an antenna apparatus 310 formed in a plurality of dielectric substrates, as a placement of the antenna apparatus. FIG. 22A is a solid view of the antenna apparatus 310, and FIG. 22B is a yz plan of the antenna apparatus 310. In the present modification, the antenna apparatus 310 represents a case where the antenna apparatus 300' is formed in a plurality of dielectric substrates, as an example. Constituent components of the antenna apparatus 310 are provided separately inside or on surfaces of dielectric substrates 105a, 105b, and 105c. In the solid view of FIG. 22A, the dielectric substrates 105a, 105b, and 105c are separated from each other for understanding a structure of each dielectric substrate. The dielectric substrates 105a, 105b, and 105c are actually stacked as illustrated in the yz plan of FIG. 22B. For the dielectric substrates 105a, 105b, and 105c, the same dielectric substrates as the dielectric substrate 105 described in the first embodiment are applicable.

In the dielectric substrate 105a, the transmission line 101 and transmission lines 102c1, 102d1, 102e1, and 102f1 are formed. The transmission line 102c1 is a portion of the transmission line 102c, the transmission line 102d1 is a portion of the transmission line 102d, the transmission line 102e1 is a portion of the transmission line 102e, and the transmission line 102f1 is a portion of the transmission line 102f.

On and in the dielectric substrate 105b, the antenna element 201 and transmission lines 102c2, 102d2, 102e2, and 102f2 are formed. The transmission line 102c2 is another portion of the transmission line 102c, the transmission line 102d2 is another portion of the transmission line 102d, the transmission line 102e2 is another portion of the transmission line 102e, and the transmission line 102f2 is another portion of the transmission line 102f.

In the dielectric substrate 105c, the hybrid coupler 301' and the transmission lines 102a, 102b, 302a', and 302b' are formed.

The dielectric substrates 105a, 105b, and 105c are electrically connected by conductor vias 303a to 303f. For example, the transmission line 101 in the dielectric substrate 105a is electrically connected to the transmission line 102a in the dielectric substrate 105c by the conductor via 303a, and the transmission line 101 is electrically connected to the transmission line 102b in the dielectric substrate 105c by the conductor via 303b. The transmission line 102c1 in the dielectric substrate 105a is electrically connected to the transmission line 102c2 in the dielectric substrate 105b by the conductor via 303c, the transmission line 102d1 in the dielectric substrate 105a is electrically connected to the transmission line 102d2 in the dielectric substrate 105b by the conductor via 303d, the transmission line 102e1 in the dielectric substrate 105a is electrically connected to the transmission line 102e2 in the dielectric substrate 105b by the conductor via 303e, and the transmission line 102f1 in the dielectric substrate 105a is electrically connected to the transmission line 102f2 in the dielectric substrate 105b by the conductor via 303f.

The dielectric substrates 105a, 105b, and 105c can be stacked by any method. For example, the dielectric substrates 105a, 105b, and 105c may be chemically stacked by adhesion using prepreg, bonding film, or the like, may be mechanically stacked by screwing, or may be thermally stacked by heating. The present modification is described about the antenna apparatus 310 formed in and on the three dielectric substrates. However, a number of dielectric substrates forming the antenna apparatus 310 is not limited to three and can be any number. In the present modification, the constituent components of the antenna apparatus 310 include those formed inside the dielectric substrates 105a, 105b, and 105c and those formed on surfaces of the dielectric substrates 105a, 105b, and 105c. However, the constituent components can be formed inside or on the surfaces of the dielectric substrates 105a, 105b, and 105c as appropriate.

The modification relating to placement of the antenna apparatus is described. Formation of the antenna apparatus on the dielectric substrates enables thickness reduction of the antenna apparatus, improving mass productivity. The improvement in mass productivity can reduce costs of the antenna apparatus.

The modifications are described above. With a hybrid coupler, the antenna apparatus in the present embodiment can cause the high frequency signals input to the input transmission lines to have a given phase difference. This enables the antenna apparatus to emit predetermined electromagnetic waves in at least two modes. The antenna element 201 is provided with differential power supply from the transmission lines 102c and 102e and provided with differential power supply from the transmission lines 102d and 102f. Therefore, the cross-polarization discrimination can be restrained from deteriorating over a wide frequency range. Placement of the antenna apparatus on the dielectric substrates enables thickness reduction of the antenna apparatus, improving mass productivity of the antenna apparatus.

Fourth Embodiment

Figure 23:
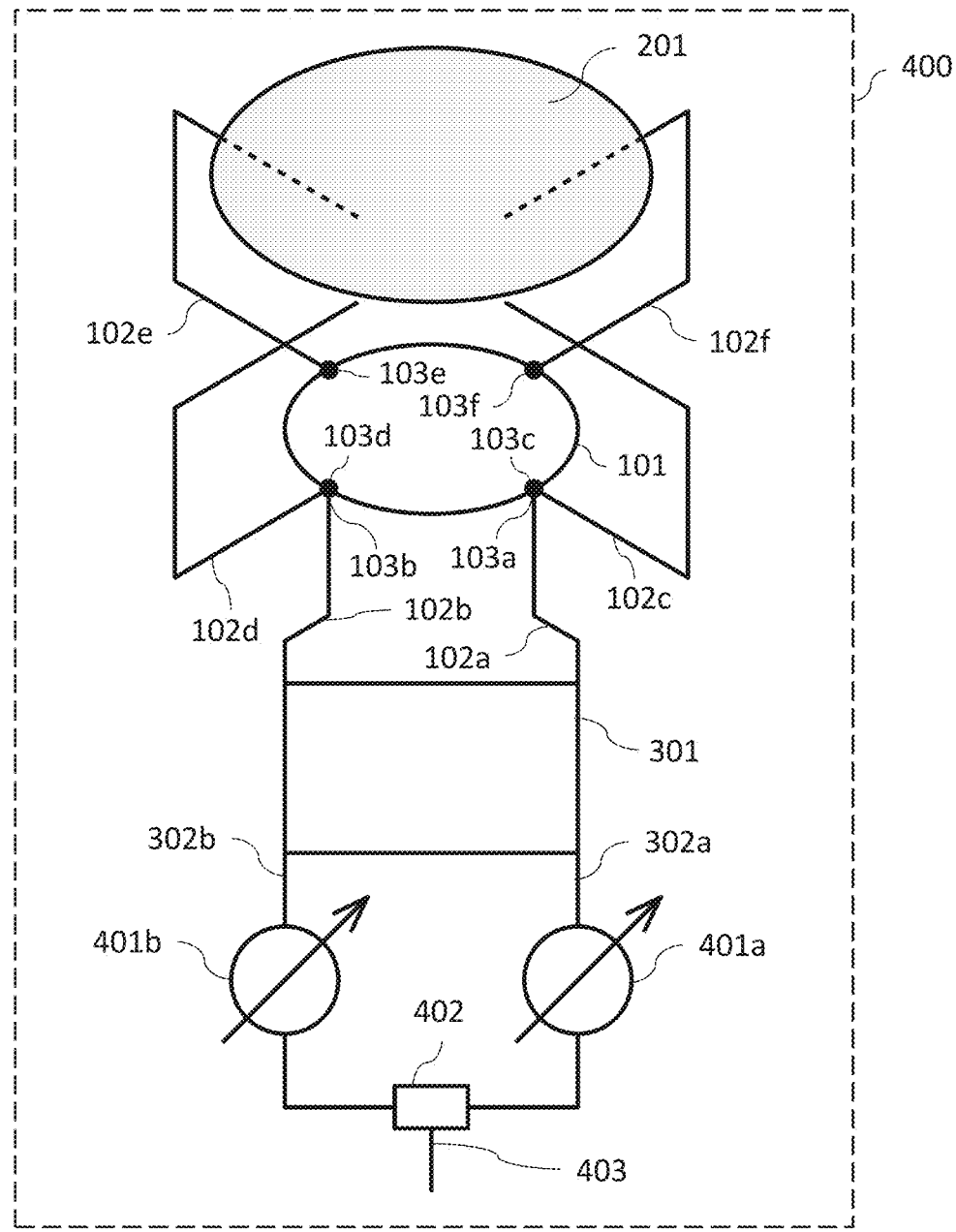
FIG. 23 is a configuration diagram of an antenna apparatus 400 in a fourth embodiment.

FIG. 23 is a solid view illustrating a configuration of an antenna apparatus 400 in a fourth embodiment. The antenna apparatus 400 includes the antenna apparatus described in the third embodiment as well as a phase shifters 401a and 401b, and a power divider 402. This enables the antenna apparatus 400 to emit a linearly polarized wave having any polarization angle "τ" without rotating the antenna apparatus mechanically. In the present embodiment, the antenna apparatus 400 includes the antenna apparatus 300' as well as the phase shifters 401a and 401b, and the power divider 402.

The phase shifters 401a and 401b shift phases of input high frequency signals by a preset amount of phase shift (hereinafter, also referred to as shift). The phase shifter 401a has one end connected to the transmission line 302a and the other end connected to the power divider 402. The phase shifter 401b has one end connected to the transmission line 302b and the other end connected to the power divider 402.

The power divider 402 divides power of the high frequency signal input from the transmission line 403 into two evenly and outputs them to the phase shifters 401a and 401b. That is, the high frequency signals output to the phase shifter 401a and the phase shifter 401b are equal in amplitude. The power divider 402 may be any power divider that can divide the power of the high frequency signal into two evenly and outputs them. Examples of such an electrical power divider include Wilkinson power divider, T junction, and the like.

How the antenna apparatus 400 operates will be described below. The high frequency signal input to the transmission line 403 is divided by the power divider 402 into two and output to the phase shifters 401a and 401b. The phase shifter 401a shifts the high frequency signal input from the power divider 402 by a preset amount of phase shift (e.g., denoted by "$\phi_1$") and input it to the transmission line 302a. The phase shifter 401b shifts the high frequency signal input from the power divider 402 by a preset amount of phase shift (e.g., denoted by "$\phi_2$") and input it to the transmission line 302b.

As described in the third embodiment, the high frequency signal input to the transmission line 302a is emitted from the antenna element 201 in a form of a left-handed circularly polarized wave. In a case of the present embodiment, the antenna element 201 emits a left-handed circularly polarized wave shifted by "$\phi_1$". In contrast, the high frequency signal input to the transmission line 302b is emitted from the antenna element 201 in a form of a right-handed circularly polarized wave. In a case of the present embodiment, the antenna element 201 emits a right-handed circularly polarized wave shifted by "$\phi_2$". That is, the antenna element 201 emits the left-handed circularly polarized wave and the right-handed circularly polarized wave in a form of a linearly polarized wave. The linearly polarized wave has a polarization angle "τ" that varies in accordance with a difference between the amount of phase shift "$\phi_1$" and the amount of phase shift "$\phi_2$". By setting the amount of phase shift "$\phi_1$" of the phase shifter 401a and the amount of phase shift "$\phi_2$" of the phase shifter 401b, a linearly polarized wave having any polarization angle "τ" is emitted.

The antenna apparatus 400 in the present embodiment is described above. As with the first to third embodiments, modifications of the fourth embodiment can be implemented and carried out variously. For example, the modifications of the first to third embodiments are applicable to the antenna apparatus 400. Modifications of the fourth embodiment will be described below.

(Modifications)

Figure 24:
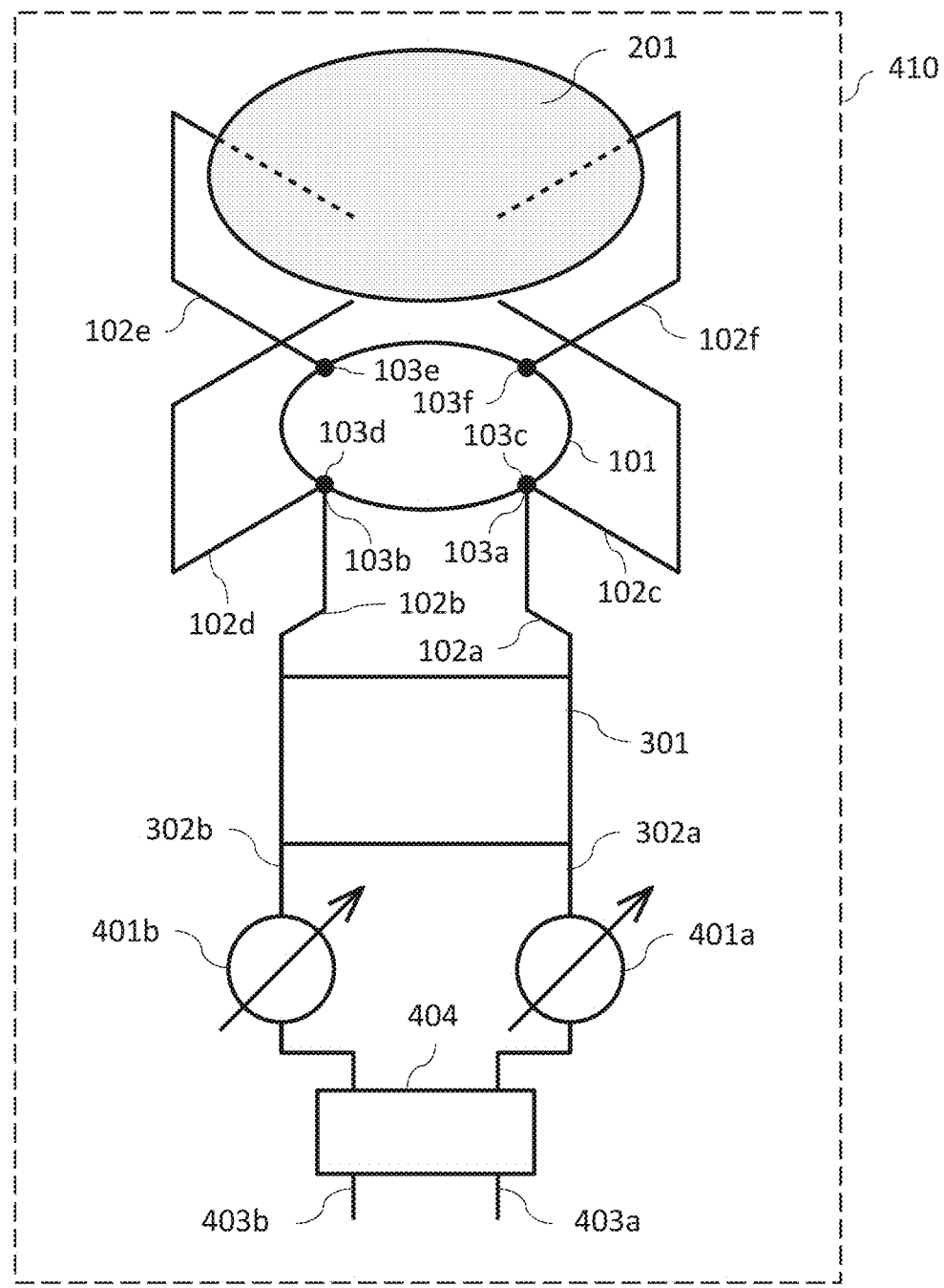
FIG. 24 is a configuration diagram of an antenna apparatus 410 applicable to the fourth embodiment.

The power divider 402 may be a hybrid coupler. FIG. 24 is a solid view of an antenna apparatus 410 configured by replacing the power divider 402 of the antenna apparatus 400 with a hybrid coupler 404. The hybrid coupler 404 may be the hybrid coupler 301 described in the third embodiment or may be the hybrid coupler 301'. FIG. 24 illustrates the hybrid coupler 404 as a block. The hybrid coupler 404 divides the input high frequency signal with a phase difference in accordance with the input sources. The amount of phase shift "$\phi_1$" of the phase shifter 401a and the amount of phase shift "$\phi_2$" of the phase shifter 401b are set at values that are determined with the phase difference between the high frequency signals input to the phase shifters 401a and 401b being provided by the hybrid coupler 404 taken into consideration. This enables a linearly polarized wave having any polarization angle "$\tau$" to be emitted as in the present embodiment. That is, the polarization angle "$\tau$" in the modification is an angle that varies in accordance with the amounts of phase shift "$\phi_1$" and "$\phi_2$" and the phase difference provided by the hybrid coupler 404 to the high frequency signals input to the phase shifters 401a and 401b.

As seen from the above, using the hybrid coupler 404 enables the antenna apparatus 410 to emit two orthogonal linearly polarized waves in accordance with the transmission line 403a or 403b without changing the amount of phase shift "$\phi_1$" of the phase shifter 401a and the amount of phase shift "$\phi_2$" of the phase shifter 401b. Furthermore, the antenna apparatus 410 can change the polarization angle "$\tau$" of the two linearly polarized waves in accordance with the changes of the amounts of phase shift "$\phi_1$" and "$\phi_2$" while maintaining orthogonality of the linearly polarized waves.

The modifications are described above. The antenna apparatus in the present embodiment further includes phase shifters and a power divider, or phase shifters and a hybrid coupler. This enables the antenna apparatus in the present embodiment to emit a linearly polarized wave having any polarization angle "$\tau$" without rotating the antenna apparatus mechanically.

Fifth Embodiment

Figure 25:
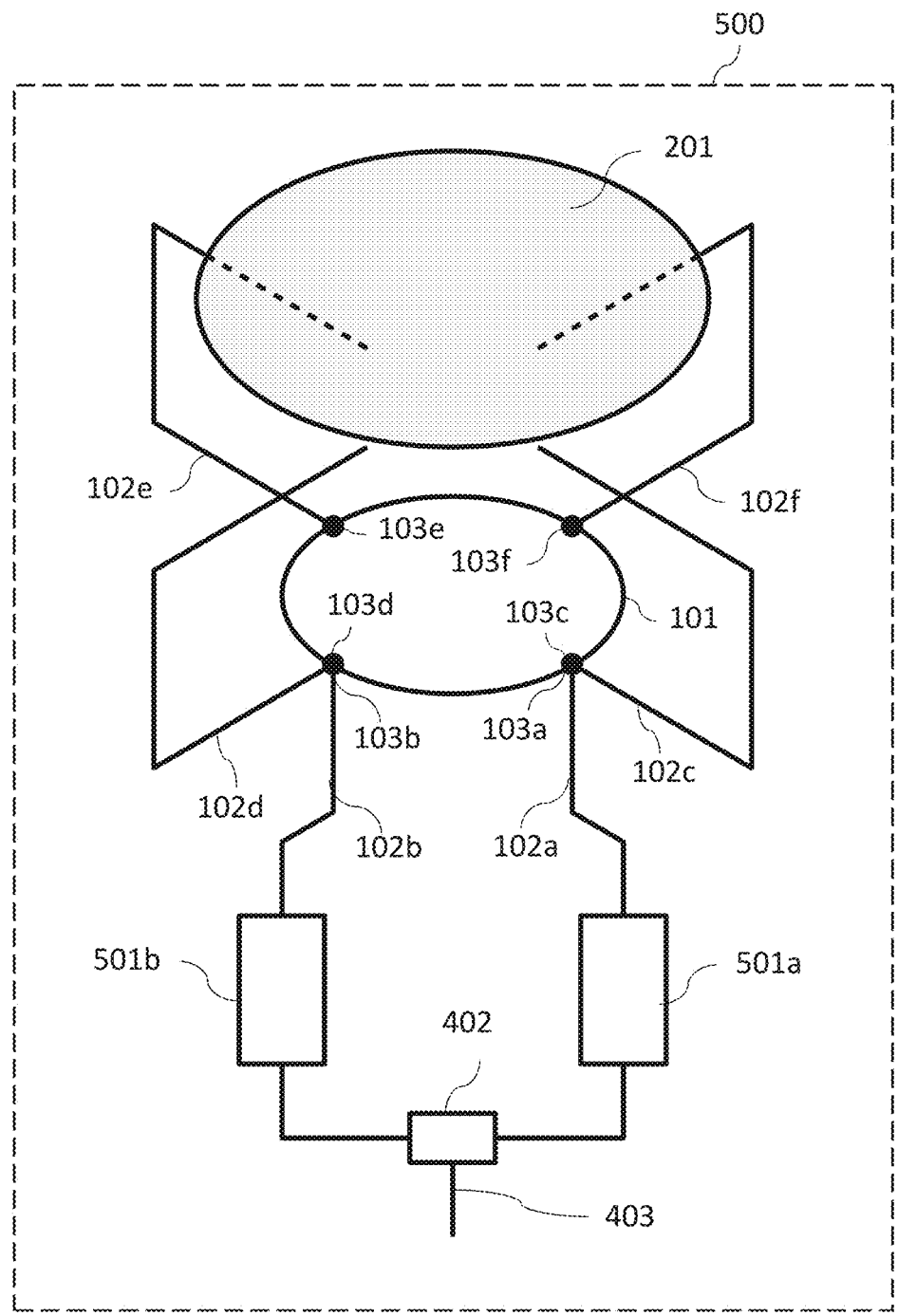
FIG. 25 is a configuration diagram of an antenna apparatus 500 in a fifth embodiment.

FIG. 25 is a solid view illustrating a configuration of an antenna apparatus 500 in a fifth embodiment. The antenna apparatus 500 includes the antenna apparatus described in the second embodiment as well as gain control circuits 501a and 501b, and a power divider 402. This enables the antenna apparatus 400 to emit a linearly polarized wave having any polarization angle "$\tau$" without rotating the antenna apparatus mechanically. In the present embodiment, the antenna apparatus 400 includes the antenna apparatus 200 as well as the gain control circuits 501a and 501b, and the power divider 402.

The gain control circuits 501a and 501b change amplitudes of high frequency signals input from the power divider 402. The change in the amplitudes of the high frequency signals may be either amplification or attenuation. The gain control circuits 501a and 501b may be any gain control circuits that can change the amplitudes of the high frequency signals. For example, the gain control circuits 501a and 501b may be variable attenuators or may be amplifiers. The variable attenuator may be used with a hybrid coupler and phase shifters in combination.

How the antenna apparatus 500 operates will be described below. A high frequency signal input to a transmission line 403 is divided by the power divider 402 into two and output to the gain control circuits 501a and 501b. The gain control circuit 501a changes an amplitude of a high frequency signal input from the power divider 402 by a preset amount of change (e.g., multiply the amplitude by "$a_1$") and input the high frequency signal to the transmission line 102a. The signal is a high frequency signal a. The gain control circuit 501b changes an amplitude of a high frequency signal input from the power divider 402 by a preset amount of change (e.g., multiply the amplitude by "$a_2$") and input the high frequency signal to the transmission line 102b. The signal is a high frequency signal b.

In the present embodiment, the high frequency signal a is finally emitted from the antenna element 201 in a form of a linearly polarized wave A in the y axis direction having an amplitude that is "$a_1$" times as much as that of the high frequency signal a. The high frequency signal b is finally emitted from the antenna element 201 in a form of a linearly polarized wave B in the x axis direction having an amplitude that is "$a_2$" times as much as that of the high frequency signal b. When emitted simultaneously, the linearly polarized wave A and the linearly polarized wave B are combined to form a linearly polarized wave C. That is, the antenna element 201 emits the linearly polarized wave A and the linearly polarized wave B in a form of the linearly polarized wave C. The linearly polarized wave C has a polarization angle "$\tau$" that varies in accordance with the amount of change "$a_1$" provided by the gain control circuit 501a and the amount of change "$a_2$" provided by the gain control circuit 501b. The polarization angle "$\tau$" is expressed by Formula (15).

[Formula 15]

$$\tau = \tan^{-1}(a_2/a_1) \qquad (15)$$

As expressed by Formula (15), by setting the amount of change $a_1$ provided by the gain control circuit 501a and the amount of change $a_2$ provided by the gain control circuit 501b, a linearly polarized wave having any polarization angle "$\tau$" is emitted.

The antenna apparatus 500 in the present embodiment is described above. As with the first and second embodiments, modifications of the fifth embodiment can be implemented and carried out variously. For example, the modifications of the first and second embodiments are applicable to the antenna apparatus 500. In addition, the antenna apparatus 500 may further include the phase shifters 401a and 401b described in the fourth embodiment. This enables compensation for variation in the phases of the high frequency signals due to the changes in the amplitudes by the gain control circuits 501a and 501b, improving the cross-polarization discrimination.

The antenna apparatus in the present embodiment includes the antenna apparatus described in the second embodiment as well as the power divider and the gain control circuits. This enables the antenna apparatus in the present embodiment to emit a linearly polarized wave having any polarization angle "$\tau$" without rotating the antenna apparatus mechanically.

Sixth Embodiment

Figure 26:
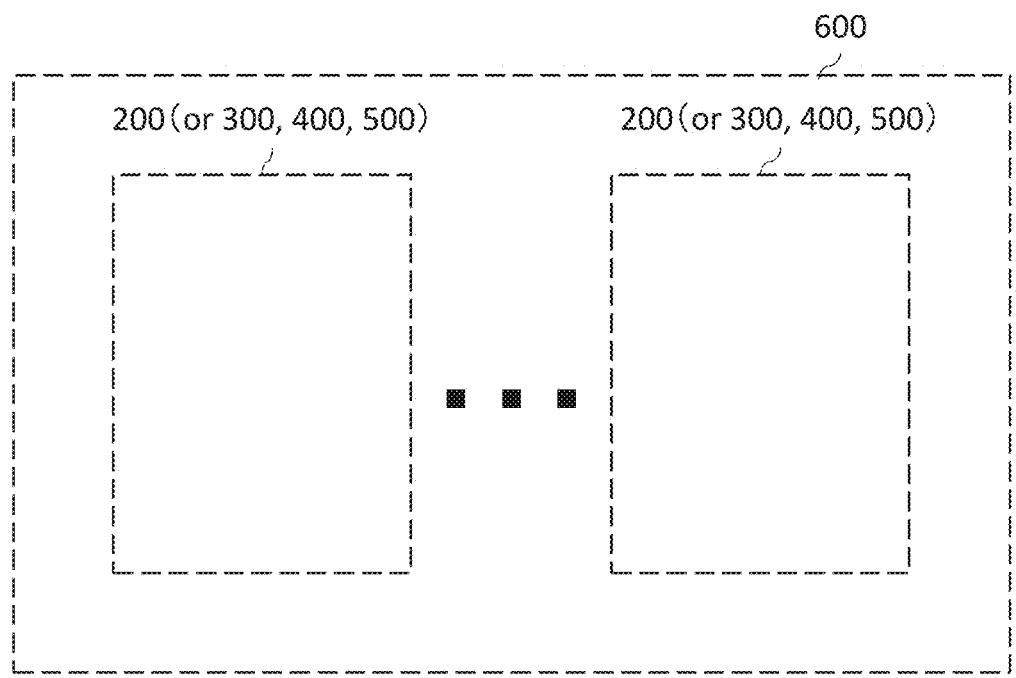
FIG. 26 is a configuration diagram of an antenna apparatus 600 in a sixth embodiment.

FIG. 26 is a diagram illustrating a configuration of an antenna apparatus 600 including a plurality of antenna apparatuses in any one of the second to fifth embodiments, which are arranged to form into an array antenna. The antenna apparatus 600 causes the constituent antenna apparatuses to emit electromagnetic waves and can thereby emit beams having directivity in one or more directions. Of the beams, a beam having a given or higher intensity will be referred to as a main beam and a direction of the main beam will be referred to as a main beam direction. The main beam direction is not limited to a single main beam direction, and a plurality of main beam directions may be present. At least some of the antenna apparatuses constituting the antenna apparatus 600 may be different from the others.

The antenna apparatus 600 changes at least one of a phase and an amplitude of a high frequency signal supplied to an antenna element 201 in each of the constituent antenna apparatuses, so as to change the main beam direction without rotating the antenna apparatus 600 mechanically and, reducing emission in a given direction. Changing at least one of the phase and the amplitude of the high frequency signal in each antenna apparatus will not be described because methods similar to those described in the above-described embodiments are applicable to the changing.

Seventh Embodiment

Figure 27:
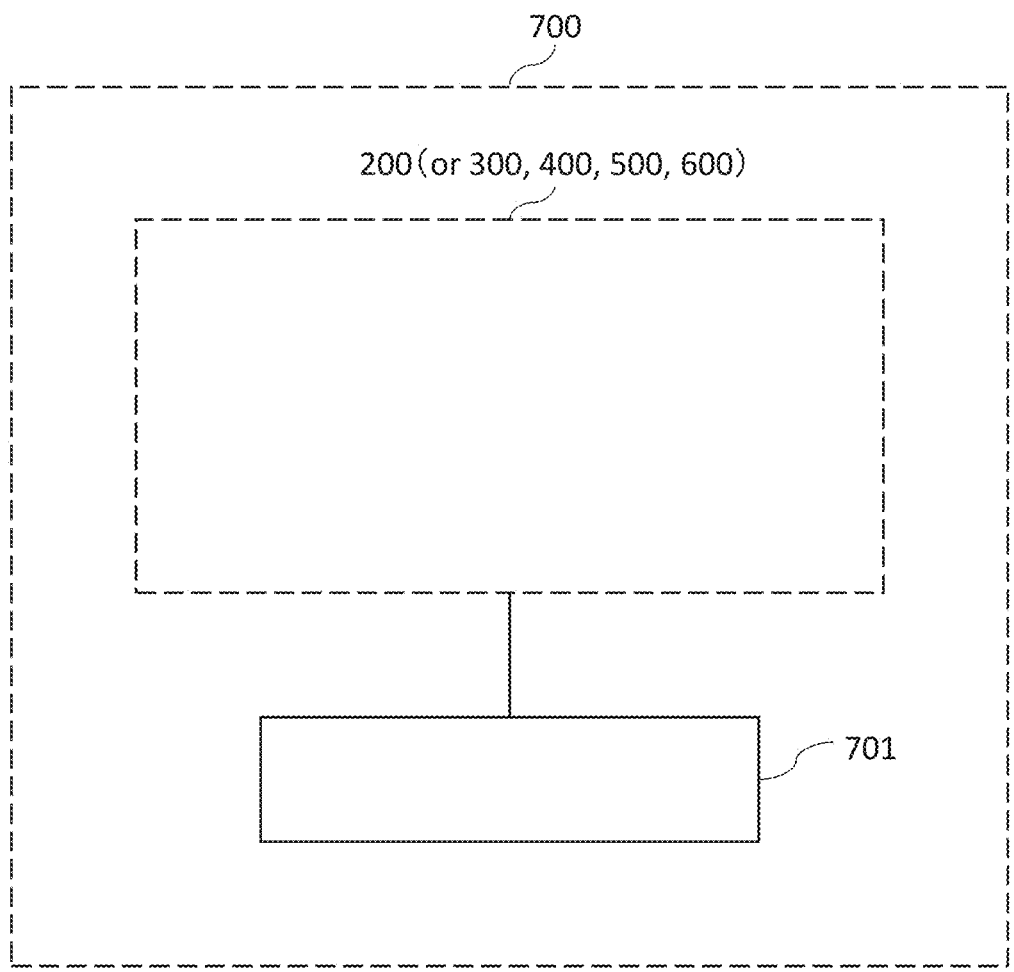
FIG. 27 is a configuration diagram of a wireless communication apparatus 700 in a seventh embodiment.

FIG. 27 is a diagram illustrating a wireless communication apparatus 700 including an antenna apparatus A being the antenna apparatus in any one of the second to sixth embodiments as well as a signal circuit 701. The wireless communication apparatus 700 emits and receives electromagnetic waves through the antenna apparatus A to communicate with another wireless communication apparatus (e.g., wireless communication apparatus W).

The signal circuit 701 is a circuit that generates and modulates a signal used in wireless communication, demodulates a high frequency signal transmitted from the antenna apparatus A, and extracts and processes information contained in the demodulated signal.

How the wireless communication apparatus 700 operates will be described. The signal circuit 701 generates and modulates a signal used in wireless communication and supplies the signal to the antenna apparatus A as a high frequency signal. The signal used in wireless communication contains, for example, a frame and the like used in the communication. The antenna apparatus A emits (transmits) a high frequency signal input from the signal circuit 701 to the wireless communication apparatus W as an electromagnetic wave. The antenna apparatus A receives an electromagnetic wave from the wireless communication apparatus W and transfers the electromagnetic wave to the signal circuit 701 as a high frequency signal. The signal circuit demodulates the high frequency signal received from the antenna apparatus A, and extracts and processes information contained in the demodulated signal.

The wireless communication apparatus 700 in the present embodiment is described above. The wireless communication apparatus in the present embodiment includes the antenna apparatus A being the antenna apparatus in any one of the second to sixth embodiments as well as the signal circuit 701. This enables the antenna apparatus A and the wireless communication apparatus being a communication partner to emit and receive electromagnetic waves in at least two modes (multimode transmission) of the antenna apparatus A, so as to increase communication capacity (communication capability). In addition, some antenna apparatus A can change the emitted polarized waves or the main beam direction of the electromagnetic waves, so as to make that the polarized waves and the main beam direction suitable for a position of the wireless communication apparatus being the communication partner and polarized waves used in the communication.

Several embodiments and modifications are described above. These embodiments and modifications may be used in combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A power divider comprising:
 a first transmission line having a closed structure;
 a first input transmission line and a second input transmission line that are connected to the first transmission line at locations away from each other along the first transmission line by approximately a quarter of a length of the first transmission line; and
 a plurality of output transmission lines that are connected to the first transmission line at locations dividing the length of the first transmission line substantially evenly, wherein:
  a first signal is input to the first input transmission line and output to at least two of the plurality of output transmission lines,
  a second signal is input to the second input transmission line and output to at least two of the plurality of output transmission lines, and
  a component of the first signal and a component of the second signal are substantially orthogonal to each other.

2. The power divider according to claim 1, wherein the location connected between the first input transmission line and the first transmission line is separated from a location connected between one of the plurality of output transmission lines and the first transmission line by a distance that is substantially an integer multiple of one eighth of the length of the first transmission line along the first transmission line.

3. The power divider according to claim 1, wherein a number of the plurality of output transmission lines is four.

4. The power divider according to claim 1, wherein the length of the first transmission line is substantially equal to a guided wavelength of the first transmission line.

5. The power divider according to claim 1, wherein a characteristic impedance of the output transmission lines ranges from 1.63 times to 2.45 times as much as a characteristic impedance of the first input transmission line and the second input transmission line.

6. The power divider according to claim 5, wherein the characteristic impedance of the output transmission lines ranges from 1.87 times to 2.14 times as much as the characteristic impedance of the first input transmission line and the second input transmission line.

7. The power divider according to claim 1, further comprising a second transmission line inside the first transmission line, the second transmission line being connected to the first transmission line at a plurality of locations.

8. The power divider according to claim 1, further comprising
 a dielectric substrate having a surface on which the first transmission line is located, wherein
 the first input transmission line, the second input transmission line, and the output transmission lines are located inside or on the surface of the dielectric substrate.

9. An antenna apparatus comprising:
 the power divider according to claim 1; and
 an emission element to receive signals from the plurality of output transmission lines and emit the signals.

10. The antenna apparatus according to claim 9, wherein
a first signal is input to the first input transmission line, output to at least two of the plurality of output transmission lines, and emitted from the emission element as a first electromagnetic wave,
a second signal is input to the second input transmission line, output to at least two of the plurality of output transmission lines, and emitted from the emission element as a second electromagnetic wave, and
the first electromagnetic wave and the second electromagnetic wave are substantially orthogonal to each other.

11. The antenna apparatus according to claim 9, further comprising a hybrid coupler to divide a received signal to the first input transmission line and the second input transmission line as signals having a phase difference.

12. The antenna apparatus according to claim 11, further comprising at least one of: a phase shifter to control a phase of a signal to be input to the hybrid coupler; and a gain control circuit to control an amplitude of the signal to be input to the hybrid coupler.

13. The antenna apparatus according to claim 9, comprising
a plurality of the antenna apparatuses that emit a beam having directivity in one or more directions, wherein the directivity of the beam depends on
a component of a first signal that is input to the first input transmission line and output to at least two of the plurality of output transmission lines and
a component of a second signal that is input to the second input transmission line and output to at least two of the plurality of output transmission lines.

14. The antenna apparatus according to claim 9, further comprising at least one dielectric substrate on a surface of or inside which the power divider and the emission element are located.

15. A wireless communication apparatus comprising:
the antenna apparatus according to claim 9; and
a signal circuit to supply a first signal to the first input transmission line and a second signal to the second input transmission line.

16. A power divider comprising:
a first transmission line having a closed structure;
a first input transmission line and a second input transmission line that are connected to the first transmission line at locations away from each other along the first transmission line by approximately a quarter of a length of the first transmission line; and
a plurality of output transmission lines that are connected to the first transmission line at locations dividing the length of the first transmission line substantially evenly,
wherein:
a number of the plurality of output transmission lines is four, and
the length of the first transmission line is substantially equal to a guided wavelength of the first transmission line.

17. A power divider comprising:
a first transmission line having a closed structure;
a first input transmission line and a second input transmission line that are connected to the first transmission line at locations away from each other along the first transmission line by approximately a quarter of a length of the first transmission line; and
a plurality of output transmission lines that are connected to the first transmission line at locations dividing the length of the first transmission line substantially evenly,
wherein a characteristic impedance of the output transmission lines ranges from 1.63 times to 2.45 times as much as a characteristic impedance of the first input transmission line and the second input transmission line.

18. A power divider comprising:
a first transmission line having a closed structure;
a first input transmission line and a second input transmission line that are connected to the first transmission line at locations away from each other along the first transmission line by approximately a quarter of a length of the first transmission line; and
a plurality of output transmission lines that are connected to the first transmission line at locations dividing the length of the first transmission line substantially evenly,
wherein the characteristic impedance of the output transmission lines ranges from 1.87 times to 2.14 times as much as the characteristic impedance of the first input transmission line and the second input transmission line.

19. A power divider comprising:
a first transmission line having a closed structure;
a first input transmission line and a second input transmission line that are connected to the first transmission line at locations away from each other along the first transmission line by approximately a quarter of a length of the first transmission line;
a plurality of output transmission lines that are connected to the first transmission line at locations dividing the length of the first transmission line substantially evenly; and
a second transmission line inside the first transmission line, the second transmission line being connected to the first transmission line at a plurality of locations.

20. An antenna apparatus comprising:
a plurality of antenna apparatuses each including:
a first transmission line having a closed structure;
a first input transmission line and a second input transmission line that are connected to the first transmission line at locations away from each other along the first transmission line by approximately a quarter of a length of the first transmission line;
a plurality of output transmission lines that are connected to the first transmission line at locations dividing the length of the first transmission line substantially evenly; and
an emission element to receive signals from the plurality of output transmission lines and emit the signals, wherein:
the plurality of antenna apparatuses emit a beam having directivity in one or more directions, and
the directivity of the beam depends on:
a component of a first signal that is input to the first input transmission line and output to at least two of the plurality of output transmission lines, and
a component of a second signal that is input to the second input transmission line and output to at least two of the plurality of output transmission lines.

* * * * *